United States Patent
Shang et al.

(10) Patent No.: US 11,021,681 B2
(45) Date of Patent: *Jun. 1, 2021

(54) MANGANESE BLEACH CATALYST GRANULES FOR USE IN DISHWASH DETERGENTS

(71) Applicant: Novozymes A/S, Bagsvaerd (DK)

(72) Inventors: Lei Shang, Smorum (DK); Peter Skagerlind, Helsingborg (SE); Pavle Andric, Copenhagen (DK); Niels-Viktor Nielsen, Saaby (DK); Kaare Joergensen Engsted, Dyssegaard (DK)

(73) Assignee: Novozymes A/S, Bagsvaerd (DK)

( * ) Notice: Subject to any disclaimer, the term of this patent is extended or adjusted under 35 U.S.C. 154(b) by 79 days.

This patent is subject to a terminal disclaimer.

(21) Appl. No.: 15/572,404

(22) PCT Filed: Dec. 18, 2015

(86) PCT No.: PCT/EP2015/080650
§ 371 (c)(1),
(2) Date: Nov. 7, 2017

(87) PCT Pub. No.: WO2016/177439
PCT Pub. Date: Nov. 10, 2016

(65) Prior Publication Data
US 2018/0171272 A1    Jun. 21, 2018

(30) Foreign Application Priority Data

May 7, 2015   (EP) ..................................... 15166857
Jul. 7, 2015   (WO) .................. PCT/EP2015/065482

(51) Int. Cl.
| | | |
|---|---|---|
| *C11D 7/32* | (2006.01) | |
| *C11D 7/38* | (2006.01) | |
| *C11D 17/08* | (2006.01) | |
| *C11D 3/39* | (2006.01) | |
| *C11D 3/386* | (2006.01) | |
| *C11D 3/28* | (2006.01) | |
| *C11D 3/04* | (2006.01) | |
| *C11D 17/00* | (2006.01) | |
| *C11D 7/10* | (2006.01) | |
| *B01J 31/18* | (2006.01) | |
| *C11D 3/00* | (2006.01) | |
| *C11D 3/12* | (2006.01) | |
| *C11D 3/20* | (2006.01) | |

(52) U.S. Cl.
CPC .......... *C11D 3/3935* (2013.01); *B01J 31/182* (2013.01); *C11D 3/0084* (2013.01); *C11D 3/046* (2013.01); *C11D 3/122* (2013.01); *C11D 3/2082* (2013.01); *C11D 3/28* (2013.01); *C11D 3/38609* (2013.01); *C11D 3/38627* (2013.01); *C11D 3/38636* (2013.01); *C11D 3/38645* (2013.01); *C11D 3/38672* (2013.01); *C11D 3/392* (2013.01); *C11D 7/10* (2013.01); *C11D 7/3281* (2013.01); *C11D 17/0039* (2013.01); *B01J 2531/72* (2013.01)

(58) Field of Classification Search
CPC ... C11D 3/28; C11D 3/38609; C11D 3/38672; C11D 3/046; C11D 3/392; C11D 7/10; C11D 7/3281; C11D 17/0039
USPC ................ 510/226, 376, 392, 441, 500, 509
See application file for complete search history.

(56) References Cited

U.S. PATENT DOCUMENTS

| | | |
|---|---|---|
| 2,549,539 A | 4/1951 | Sparks |
| 3,398,096 A | 8/1968 | Rotterdam et al. |
| 4,246,612 A | 1/1981 | Berry et al. |
| 4,430,243 A | 2/1984 | Bragg |
| 4,728,455 A | 3/1988 | Rerek |
| 5,114,606 A | 5/1992 | Van Vilet |
| 5,114,611 A | 5/1992 | Van Kralingen |
| 5,153,161 A | 10/1992 | Kerscher |
| 5,194,416 A | 3/1993 | Jureller |
| 5,227,084 A | 7/1993 | Martens |
| 5,244,594 A | 9/1993 | Favre |
| 5,246,612 A | 9/1993 | Van Dijk |
| 5,246,621 A | 9/1993 | Favre |
| 5,256,779 A | 10/1993 | Kerscher |
| 5,274,147 A | 12/1993 | Kerscher |
| 5,280,117 A | 1/1994 | Kerscher |
| 5,284,944 A | 2/1994 | Madison |
| 5,324,649 A | 6/1994 | Arnold |
| 5,356,554 A | 10/1994 | Delwel |
| 5,888,954 A | 3/1999 | Haerer |
| 2012/0322708 A1 | 12/2012 | Lant et al. |
| 2013/0040872 A1* | 2/2013 | Borup ................ C11D 3/38672 510/375 |

(Continued)

FOREIGN PATENT DOCUMENTS

| | | |
|---|---|---|
| DE | 4315397 A1 | 11/1994 |
| EP | 0135226 A2 | 3/1985 |

(Continued)

OTHER PUBLICATIONS

Anonymous, 2018, wikipedia definition of derivatives of Triazacyclononane.

(Continued)

*Primary Examiner* — Gregory D Delcotto
(74) *Attorney, Agent, or Firm* — Eric Fechter

(57) ABSTRACT

The present invention relates to co-granules comprising an enzyme and a bleach catalyst and to their use in bleach-containing granular automatic dishwash (ADW) detergents.

19 Claims, No Drawings
Specification includes a Sequence Listing.

(56) References Cited

U.S. PATENT DOCUMENTS

2014/0206593 A1\* 7/2014 Simonsen .......... C11D 3/38672
                                                            510/374

FOREIGN PATENT DOCUMENTS

| EP | 0135227 A2 | 3/1985 |
|---|---|---|
| EP | 0544490 A1 | 6/1993 |
| EP | 0549271 A1 | 6/1993 |
| EP | 0549272 A1 | 6/1993 |
| EP | 1524313 A1 | 4/2005 |
| GB | 1131738 | 10/1968 |
| WO | 1994012613 A1 | 6/1994 |
| WO | 199722680 A1 | 6/1997 |
| WO | 199722681 A1 | 6/1997 |
| WO | 199855577 A1 | 12/1998 |
| WO | 200001793 A1 | 1/2000 |
| WO | 2005/095570 A1 | 10/2005 |
| WO | 2011134809 A1 | 11/2011 |
| WO | 2016005392 A1 | 1/2016 |

OTHER PUBLICATIONS

Lide, 1990-1991, Handbook of chemistry and physics CRC Press sec 15, 21.

\* cited by examiner

MANGANESE BLEACH CATALYST GRANULES FOR USE IN DISHWASH DETERGENTS

CROSS-REFERENCE TO RELATED APPLICATIONS

This application is a 35 U.S.C. 371 national application of PCT/EP2015/080650 filed Dec. 18, 2018, which claims priority or the benefit under 35 U.S.C. 119 of European application no. 15166857.1 filed May 7, 2015, and International application no. PCT/EP/2015/065482, filed Jul. 7, 2015, the contents of which are fully incorporated herein by reference.

REFERENCE TO SEQUENCE LISTING

This application contains a Sequence Listing in computer readable form. The computer readable form is incorporated herein by reference.

FIELD OF THE INVENTION

The present invention relates to manganese bleach catalyst granules comprising an enzyme and to their use in bleach-containing granular automatic dishwash (ADW) detergents. More particularly, it relates to co-granules wherein the enzyme and the bleach catalyst have good storage stability in bleach-containing ADW detergent. The invention also relates to bleach-containing granular ADW detergents comprising the co-granules.

BACKGROUND OF THE INVENTION

In automatic dish-washers, it is common to use granular detergents which contain a bleach (a $H_2O_2$ source such as perborate or percarbonate). It is well known to improve the effect of the bleach at low temperatures by adding a bleach catalyst, e.g., a bleach catalyst comprising manganese and a ligand which is di- or trimethyl azacyclononane or a derivative thereof such as MnTACN). Enzymes (such as protease and amylase) are commonly added to improve the removal of soiling.

It is known that storage stability tends to be problematic when the enzyme and the bleach catalyst are added to the ADW detergent, and the prior art discloses ways of overcoming this. Thus, WO 97/22680 discloses composite particles comprising a bleach catalyst and one or more enzymes for use in ADW detergents, in order to protect the bleach catalyst and the enzyme from other detergent ingredients. WO 2011/134809 discloses enzyme granules with improved enzyme stability in a powder detergent.

SUMMARY OF THE INVENTION

The inventors have developed co-granules comprising an enzyme and a bleach catalyst where both components have improved storage stability in a bleach-containing granular automatic dishwash (ADW) detergent.

Accordingly, the invention provides co-granules comprising
(a) a core which comprises an enzyme, surrounded by
(b) a first coating which comprises bleach catalyst particles, which is surrounded by
(c) a second coating comprising at least 60% by weight of a water-soluble salt having a constant humidity at 20° C. which is above 85%;
wherein the bleach catalyst particles comprise at least 80% by weight of a manganese complex with nitrogen-containing ligands, characterized in that at least 70% by weight of the particles have particle sizes in the range from 1 µm to 50 µm, at most 15% by weight of the particles have particle sizes of >50 µm, and at most 15% by weight of the particles have particle sizes of <1 µm, wherein the percentages are based on the total amount of the particles.

The invention also provides a method for making the above-mentioned co-granules of the invention; and a method for stabilizing an enzyme by incorporating the enzyme into a granule according to the invention.

Further, the invention provides a granular automatic dishwash detergent composition comprising a bleaching system comprising a $H_2O_2$ source, which further comprises the co-granules.

Other aspects and embodiments of the invention are apparent from the description and examples.

DETAILED DESCRIPTION OF THE INVENTION

As mentioned above, several technologies have been described earlier for improving the storage stability of enzymes, for example by protecting them physically from other detergent ingredients—in particular to protect and separate enzymes from bleaching system components. Bleach catalysts are bleaching system components, and as such they are usually separated from enzymes, for example by coating enzyme-containing granules to avoid direct contact.

Contrary to expectations, we have found that manganese-containing bleach catalysts with di- or trimethyltriazacyclononanes ligands (MnTACN and derivatives thereof) are in fact capable of stabilizing enzymes, when the bleach catalyst and the enzyme is present in the same granule.

This is particularly useful in automatic dishwash detergents, where these bleach catalysts are widely used. At the same time, the granule coating may also protect and improve the stability of the bleach catalyst itself.

It is a particular advantage to use the manganese-containing bleach catalysts in the form of very small bleach catalyst particles. This ensures a better yield in the production process and a higher uniformity of the final granules of the invention, as well as a higher stability of the bleach catalyst itself.

Co-Granule

A co-granule of the invention is a particle containing enzyme(s) and a bleach catalyst according to the invention. The granule may be (roughly) spherical.

The granule typically has an average diameter of 20-2000 µm, particularly 50-1500 µm, 100-1500 µm or 250-1200 µm.

The granule is composed of a core, and one or more coatings (outer layers) surrounding the core.

Core

The core comprises the enzyme(s). The granules of the invention typically include between about 0.005 to about 500 mg/g on a dry weight basis of the enzyme component relative to the core (as active enzyme protein). For instance, the amount of enzyme in embodiments of the invention comprises about 0.05 to 300 mg/g, about 0.1 to 250 mg/g, about 0.5 to 200 mg/g, about 0.5 to 200 mg/g, about 1.0 to 150 mg/g in the granule, or about 5.0 to 150 mg/g relative to the core.

The core may also comprise an enzyme stabilizer such as a reducing agent/antioxidant and/or a salt of a multivalent cation and/or an acidic buffer component, typically as a homogenous blend. The blend may also include binders (such as synthetic polymer, wax, fat, or carbohydrate). The blend may further include additional materials such as fillers, fibre materials (cellulose or synthetic fibres), stabilizing agents, solubilising agents, suspension agents, viscosity regulating agents, light spheres, plasticizers, salts, lubricants and fragrances.

The core can be prepared by granulating the blend, e.g. by use of granulation techniques including: crystallisation, precipitation, pan-coating, fluid bed coating, fluid bed agglomeration, rotary atomization, extrusion, prilling, spheronization, size reduction methods, drum granulation, and/or high shear granulation.

The core may consist of an inert particle with the blend absorbed into it, or with the blend applied on to the surface e.g. via fluid bed coating.

The core particle may have a diameter of 20-2000 µm, particularly 50-1500 µm, 100-1500 µm or 250-1200 µm.

Reducing Agent, Peroxide and/or Antioxidant

The core may contain a reducing agent, a peroxide decomposing catalyst and/or an antioxidant (a molecule capable of slowing or preventing the oxidation of other molecules). Examples are sulfites, thiosulfates, erythorbates, ascorbates and nitrites, e.g. as salts of alkali metals and earth alkali metals. Other suitable materials are methionine, cysteine, propyl gallate, tert-butyl hydroquinone, tocopherols, thiodipropionic acid, butylated hydroxytoluene (BHT), butylated hydroxyanisol (BHA) or tannic acid.

The amount of the antioxidant, peroxide decomposing catalyst or reducing agent may be at least 0.1% by weight relative to the core, particularly at least 0.2%, at least 0.5%, at least 1%, or at least 1% The amount may be at most 10% by weight relative to the core, particularly at most 5%, at most 4%, at most 3% or at most 2%. Here, the amount of a salt is calculated in anhydrous form. Peroxide decomposing catalysts can be efficient in even lower concentrations, e.g. at least 0.001%, or at least 0.01%; the amount may be at most 5% or at most 1%.

Salt of a Multivalent Cation

The core may contain a salt of a multivalent cation in the core, particularly a divalent or trivalent cation, e.g., a salt of Mg, Zn, Cu, Mn, Ca or Al. The salt may include an organic or inorganic anion such as sulfate, chloride or acetate. Particular salts include magnesium sulfate and zinc sulfate, e.g. magnesium sulfate heptahydrate.

The salt may be used in an amount of at least 0.1% by weight of the core, particularly at least 0.5% by weight, e.g. at least 1% by weight. The amount may be at most 15%, 10% or 5%. The percentage indicates the amount of the salt in anhydrous form.

The multivalent cation may be used in an amount of at least 0.02% by weight of the core, particularly at least 0.1% by weight, e.g. at least 0.2% by weight. The amount may be at most 6%, at most 4% or at most 2%. The percentage indicates the amount of the multivalent cation.

Acidic Buffer Component

The core may contain an acidic buffer component (acidic buffering agent) in the core or the coating. The amount may be at least 0.1 by weight of the core, particularly at least 1% by weight. The amount is typically at most 10% by weight of the core, particularly at most 5% by weight. The percentage indicates the amount in anhydrous form.

The acidic buffer component has a pH below 7 when measured as a 1% by weight aqueous solution (or alternatively a 10% solution). The acidic buffer component may have a pH of 1 to below 7, e.g. a pH of 3 to below 7, particularly a pH of 4 to 5. The acidic buffer component is typically a mixture comprising a weak acid and the corresponding base; it is at least partly in its acid form Furthermore the acidic buffer component has a pKa from 2 to 9, in particular a $pK_a$ from 4 to 9, in particular a $pK_a$ from 5 to 8, in particular a $pK_a$ from 2 to 6, in particular a $pK_a$ from 2 to 5, in particular a $pK_a$ from 2 to 4, in particular a $pK_a$ from 5 to 7. To utilize most of the potential buffer capacity the pH of an aqueous solution is in general below the $pK_a$.

Particularly suitable acidic buffer components are salts of $H_3PO_4$ e.g. $NaH_2PO_4$, $KH_2PO_4$, and $Ca(H_2PO_4)_2$, polyphosphates e.g. sodium hexametaphosphate, polyacrylic acid and partly neutralized polyacrylic acid and co-polymers thereof, simple organic acids (less than 10 carbon atoms e.g. 6 or less carbon atoms) such as citric acid and salts thereof such as hydrogen citrate, e.g. disodium hydrogen citrate, malonic, succinic, glutaric, adipic acid.

In a particular embodiment the acidic buffer components are selected from the group consisting of polyacrylic acid and partly neutralized polyacrylic acid and co-polymers thereof, citric acid and $Na_3$-citrate.

Coatings

The granule comprises a core surrounded by a first and a second coating. Each coating should form a substantially continuous layer. A substantially continuous layer is to be understood as a coating having few or no holes, so that the core unit it is encapsulating has few or none uncoated areas. The layer or coating should in particular be homogenous in thickness.

First Coating

The first coating comprises the bleach catalyst, e.g. in an amount of 2-15% by weight of the core, particularly 3-10%. It may also comprise a binder, particularly a carbohydrate binder such as dextrin and/or sucrose, e.g. in an amount of 1-20% by weight of the core.

Second Coating

The coating comprises at least 60% by weight w/w of a salt, e.g. at least 65%, at least 70%, at least 75%, at least 80%, at least 85%, at least 90%, at least 95% or at least 99% by weight w/w.

The coating may be applied in an amount of at least 5% by weight of the core, e.g. at least 10%, 10% or 15%. The amount may be at most 70%, 50%, 40% or 30%.

To provide acceptable protection, the salt coating is preferably at least 1 µm thick, particularly at least 2 µm, at least 4 µm or at least 8 µm. The thicker the coating the more time consuming and expensive it gets to produce the granule. In a particular embodiment the thickness of the salt coating is below 100 µm. In a more particular embodiment the thickness of the salt coating is below 60 µm. In an even more particular embodiment the total thickness of the salt coating is below 40 µm.

The salt may be added from a salt solution where the salt is completely dissolved or from a salt suspension wherein the fine particles is less than 50 µm, such as less than 10 µm or less than 5 µm.

The salt coating is especially effective if it is applied in a fluid bed under relatively high humidity conditions.

The salt coating can further contain other materials as known in the art, e.g. fillers, antisticking agents, pigments, dyes, plasticizers and/or binders, such as titanium dioxide, kaolin, calcium carbonate or talc.

Salts

The salt in the second coating may be an inorganic salt or organic salt. It has a constant humidity at 20° C. above 85%, particularly above 90%, or it may be another hydrate form of such a salt (e.g. anhydrate). The salt coating may be according to WO 00/01793.

The second coating may comprise a single salt or a mixture of two or more salts. The salt may be water soluble, in particular having a solubility at least 0.1 grams in 100 g of water at 20° C., preferably at least 0.5 g per 100 g water, e.g. at least 1 g per 100 g water, e.g. at least 5 g per 100 g water.

Specific examples of suitable salts are $Na_2CO_3$ ($CH_{20°\ C.}$=92%), $Na_2HPO_4$ ($CH_{20°\ C.}$=95%), $Na_3PO_4$ ($CH_{25°\ C.}$=92%), $(NH_4)_2HPO_4$ ($CH_{20°\ C.}$=93.0%), $NH_4H_2PO_4$ ($CH_{20°\ C.}$=93.1%), $K_2HPO_4$ ($CH_{20°\ C.}$=92%), $KH_2PO_4$ ($CH_{20°\ C.}$=96.5%), $KNO_3$ ($CH_{20°\ C.}$=93.5%), $Na_2SO_4$ ($CH_{20°\ C.}$=93%), $K_2SO_4$ ($CH_{20°\ C.}$=98%), $KHSO_4$ ($CH_{20°\ C.}$=86%), $MgSO_4$ ($CH_{20°\ C.}$=90%), $ZnSO_4$ ($CH_{20°\ C.}$=90%) and sodium citrate ($CH_{25°\ C.}$=86%).

The salt may be in anhydrous form, or it may be a hydrated salt, i.e. a crystalline salt hydrate with bound water(s) of crystallization, such as described in WO 99/32595. Specific examples include anhydrous sodium sulfate ($Na_2SO_4$), anhydrous magnesium sulfate ($MgSO_4$), magnesium sulfate heptahydrate ($MgSO_4(7H_2O)$), zinc sulfate heptahydrate ($ZnSO_4(7H_2O)$), sodium phosphate dibasic heptahydrate ($Na_2HPO_4(7H_2O)$), and sodium citrate dihydrate.

Preferably the salt it applied as a solution of the salt e.g. using a fluid bed.

Optional Third Coating

Optionally, the granule may include an additional coating on the outside of the salt coating, e.g. in an amount of at least 0.5% by weight of the core, particularly at least 1%, e.g. at most 20% or 10%. The additional coating may comprise polyethylene glycol (PEG), hydroxypropyl methyl cellulose (HPMC or MHPC), polyvinyl alcohol (PVA) or other film forming agents and can further contain fillers, antisticking agents, pigment, dye, plasticizers etc.

Other additional coatings on the inside or outside of the salt coatings may be applied as known for people skilled in the art.

Bleach Catalyst

The bleach catalyst used as a component of (and to prepare) the granule of the invention is a manganese complex with nitrogen-containing ligands; preferably the nitrogen-containing ligands comprises at least one ligand selected from the group consisting of di- or trimethyltriazacyclononanes and derivates thereof.

In an embodiment, the bleach catalysts are manganese complexes of the oxidation step II, III or in particular IV that contains one or more macrocyclic ligand(s) with the donor functions N and/or NR; where R is a hydrocarbon residue with up to 5 C-atoms, in particular methyl, ethyl or propyl.

Preferred bleach catalysts are manganese complexes with ligands selected from the group 1,4,7-trimethyl-1,4,7-triazacyclononane, 1,4,7-triazacyclononane, 1,5,9-trimethyl-1.[delta].[theta]-triazacyclododecan, 2-methyl-1,4,7-trimethyl-1,4,7-triazacyclononane, 2-methyl-1,4,7-triazacyclononane, 1,2-bis-(4,7-dimethyl-1,4,7-triazacyclonono-1-yl) ethane, cyclam or its methyl-substituted derivatives, and/or cyclen or its methyl-substituted derivatives, in particular 1,8-dimethylcyclam, 1,7-dimethylcyclen, 1,8-diethylcyclam, 1,7-diethylcyclen, 1,8-dibenzylcyclam or 1,7-dibenzylcyclen.

Particularly preferred ligands are 1,4,7-trimethyl-1,4,7-triazacyclononane (Me-TACN), 1,4,7-triazacyclononane (TACN) or bridged ligands such as 1,2-bis-(4,7-dimethyl-1,4,7-triazacyclonono-1-yl) ethane (Me4-DTNE), as described for example in EP 0 458 397, EP 0 458 398, EP 0 549 272, EP 0 530 870, WO 96/06154, WO 96/06157 or WO 2006/125517.

The type of counter-ion (e.g., X in formulae 1 and 2 below) for charge neutrality is not critical for the activity of the manganese complex and can be selected from, for example, any of the following counter-ions: chloride; sulphate; nitrate; methylsulphate; surfactant anions, such as the long-chain alkylsulphates, alkylsulphonates, alkylbenzenesulphonates, tosylate; trifluoromethylsulphonate; perchlorate ($ClO_4^-$), $BPh_4^-$, and $PF_6^-$, though some counter-ions are more preferred than others for reasons of product property and safety.

In a particular embodiment of the invention, the bleach catalyst is a bleach enhancing manganese complex according to the following formula (1) or the following formula (2):

Formula (1)

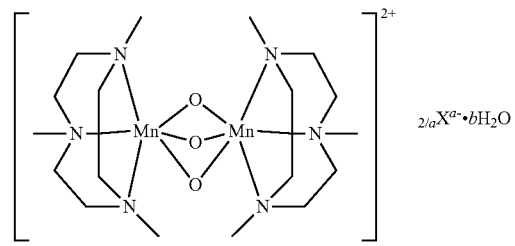

$2/aX^{a-} \cdot bH_2O$

Formula (2)

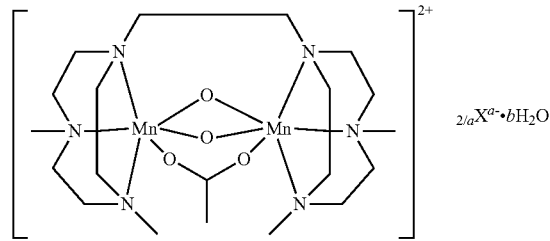

$2/aX^{a-} \cdot bH_2O$ wherein a is 1 or 2; b is a number from 0 to 4; and X is any monovalent or divalent anion, preferably the anion is $PF_6^-$, $CH_3COO^-$, $Cl^-$, $SO_4^{2-}$, and in particular $PF_6^-$.

Most particularly preferred bleach catalyst particles contain as bleach catalyst bis (N,N',N''-trimethyl-1,4,7-triazacyclononane)-trioxo-dimangan (IV) di(hexafluorophosphate) monohydrate, that is available as Peractive® MnTACN.

The bleach catalyst is provided in the form of bleach catalyst particles having at least 80% by weight of the above-mentioned bleach catalyst; preferably having at least 90% by weight, and in particular having 95 to 100% by weight of the above-mentioned bleach catalyst.

The bleach catalyst particles are characterized in that at least 70% by weight of the particles have a particle size in the range from 1 μm to 50 μm, at most 15% by weight of the particles have a particle size of >50 μm (more than 50 μm), and at most 15% by weight of the particles have a particle size of <1 μm (less than 1 μm), wherein the percentages are based on the total amount of the particles.

The determination of particle size according to the invention is obtained by laser diffractometry using the standard ISO 13320 (2009).

The particle sizes stated are the sizes of the primary particles. The powders according to the invention may also contain aggregates from the primary particles. The size of these aggregates is typically from 5 µm to 5000 µm.

Preferred bleach catalyst particles are characterized in that at least 90% by weight of the particles have particle sizes in the range from 2 µm to 50 µm, at most 5% by weight of the particles have particle sizes of >50 µm, and at most 5% by weight of the particles have particle sizes of <2 µm, wherein the percentages are based on the total amount of the particles.

In a particularly preferred embodiment, the bleach catalyst particles have a volume average particle size $D_{50}$ in the range from 2 µm to 25 µm.

$D_{50}$ means that 50% by volume of the particles are smaller than the specified value for $D_{50}$. Similarly, $D_{97}$ means that 97% by volume of the particles are smaller than the specified value for $D_{97}$. Similarly, $D_{99}$ and $D_{10}$ mean that 99 and 10% by volume, respectively, of the particles are smaller than the specified value for $D_{99}$ and $D_{10}$, respectively.

In an embodiment, the bleach catalyst particles have a volume average particle size $D_{99}$ of <50 µm and $D_{10}$ of <5 µm.

In a preferred embodiment, the bleach catalyst particles have a volume average particle size $D_{97}$ of <50 µm and $D_{10}$<5 µm.

In a more preferred embodiment, the bleach catalyst particles have a volume average particle size $D_{99}$ of <50 µm and $D_{10}$<1 µm.

In a most preferred embodiment, the bleach catalyst particles comprise no particles having particle sizes greater than 100 µm and/or no particles having particle sizes of less than 100 nm.

In another embodiment, the bleach catalyst particles have a volume average particle size $D_{97}$ in the range of 8 µm to 35 µm.

In another particularly preferred embodiment, the bleach catalyst particles have a volume average particle size $D_{97}$ in the range of 10 µm to 30 µm.

In a yet more particularly preferred embodiment, the bleach catalyst particles have a volume average particle size $D_{97}$ in the range of 11 µm to 25 µm.

In a yet more particularly preferred embodiment the bleach catalyst particles have a volume average particle size $D_{97}$ in the range of 12 µm to 20 µm.

The distribution of the particle sizes of the bleach catalyst particles can be monomodal or polymodal, preferably monomodal or bimodal, and particularly monomodal. The distribution can be symmetrical or asymmetrical.

The bleach catalyst particles may be produced by the steps of:
(a) introducing a particulate material, comprising at least 80% by weight of a bleach catalyst manganese complex with nitrogen-containing ligands (as described above), into a milling apparatus selected from the group consisting of a jet mill, a pin mill equipped with a cooling device, and a wet mill, wherein the milling apparatus is equipped with a particle separation device (such as a sieve or a cyclone),
(b) grinding the particulate material into a finely divided powder with the proviso that
(c) the temperature of the particulate material during the grinding does not exceed 95° C.; preferably the temperature of the ground material during the grinding is −15° C. to 95° C., preferably <70° C., more preferably <60° C., and most preferably <50° C.

A particularly preferred milling device is the wet mill.

In an embodiment, the grinding of step (b) is carried out so that at least 70% by weight of the total amount of particles of the finely divided powder have particle sizes in the range from 1 µm to 50 µm, at most 15% by weight of the particles have particle sizes of >50 µm, and at most 15% by weight of the particles have particle sizes of <1 µm.

In an embodiment, the temperature of the ground material during grinding is controlled by the supply of cooling gas or by the supply of liquefied gas.

In an embodiment, the coarse particles separated in the particle separation device are led back into the milling apparatus.

In another embodiment, the manganese complex containing particulate material is ground in dry state.

Enzymes

The granule may comprise one or more enzymes such as a protease, lipase, cutinase, an amylase, carbohydrase, cellulase, pectinase, mannanase, arabinase, galactanase, xylanase, pectate lyase, oxidase, e.g., a laccase, and/or peroxidase.

Examples of suitable enzymes are shown below.

Cellulases

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259.

Especially suitable cellulases are the alkaline or neutral cellulases having colour care benefits. Examples of such cellulases are cellulases described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307 and WO99/001544.

Other cellulases are endo-beta-1,4-glucanase enzyme having a sequence of at least 97% identity to the amino acid sequence of position 1 to position 773 of SEQ ID NO:2 of WO 2002/099091 or a family 44 xyloglucanase, which a xyloglucanase enzyme having a sequence of at least 60% identity to positions 40-559 of SEQ ID NO: 2 of WO 2001/062903.

Commercially available cellulases include Celluzyme™, and Carezyme™ (Novozymes NS) Carezyme Premium™ (Novozymes NS), Celluclean™ (Novozymes NS), Celluclean Classic™ (Novozymes NS), Cellusoft™ (Novozymes NS), Whitezyme™ (Novozymes NS), Clazinase™, and Puradax HA™ (Genencor International Inc.), and KAC-500(B)™ (Kao Corporation).

Suitable cellulases include complete cellulases or mono-component endoglucanases of bacterial or fungal origin. Chemically or genetically modified mutants are included. The cellulase may for example be a mono-component or a mixture of mono-component endo-1,4-beta-glucanase often just termed endoglucanases. Suitable cellulases include a fungal cellulase from *Humicola insolens* (U.S. Pat. No. 4,435,307) or from *Trichoderma*, e.g. *T. reesei* or *T. viride*. Examples of cellulases are described in EP 0 495 257. Other suitable cellulases are from *Thielavia* e.g. *Thielavia terrestris* as described in WO 96/29397 or *Fusarium oxysporum* as described in WO 91/17244 or from *Bacillus* as described in, WO 02/099091 and JP 2000210081. Other examples are cellulase variants such as those described in WO 94/07998, EP 0 531 315, U.S. Pat. Nos. 5,457,046, 5,686,593, 5,763, 254, WO 95/24471, WO 98/12307. Commercially available cellulases include Carezyme®, Celluzyme®, Celluclean®, Celluclast® and Endolase®; Renozyme®; Whitezyme® (Novozymes NS) Puradax®, Puradax HA, and Puradax EG (available from Genencor).

Mannanases

Suitable mannanases include those of bacterial or fungal origin. Chemically or genetically modified mutants are included. The mannanase may be an alkaline mannanase of Family 5 or 26. It may be a wild-type from *Bacillus* or *Humicola*, particularly *B. agaradhaerens, B. licheniformis, B. halodurans, B. clausii*, or *H. insolens*. Suitable mannanases are described in WO 1999/064619. A commercially available mannanase is Mannaway (Novozymes NS).

Proteases

Suitable proteases include those of bacterial, fungal, plant, viral or animal origin e.g. vegetable or microbial origin. Microbial origin is preferred. Chemically modified or protein engineered mutants are included. It may be an alkaline protease, such as a serine protease or a metalloprotease. A serine protease may for example be of the 51 family, such as trypsin, or the S8 family such as subtilisin. A metalloproteases protease may for example be a thermolysin from e.g. family M4 or other metalloprotease such as those from M5, M7 or M8 families. The term "subtilases" refers to a sub-group of serine protease according to Siezen et al., Protein Engng. 4 (1991) 719-737 and Siezen et al. Protein Science 6 (1997) 501-523. Serine proteases are a subgroup of proteases characterized by having a serine in the active site, which forms a covalent adduct with the substrate. The subtilases may be divided into 6 sub-divisions, i.e. the Subtilisin family, the Thermitase family, the Proteinase K family, the Lantibiotic peptidase family, the Kexin family and the Pyrolysin family.

Examples of subtilases are those derived from *Bacillus* such as *Bacillus lentus, B. alkalophilus, B. subtilis, B. amyloliquefaciens, Bacillus pumilus* and *Bacillus gibsonii* described in; U.S. Pat. No. 7,262,042 and WO09/021867, and subtilisin lentus, subtilisin Novo, subtilisin Carlsberg, *Bacillus licheniformis*, subtilisin BPN', subtilisin 309, subtilisin 147 and subtilisin 168 described in WO89/06279 and protease PD138 described in (WO93/18140). Other useful proteases may be those described in WO92/175177, WO01/016285, WO02/026024 and WO02/016547. Examples of trypsin-like proteases are trypsin (e.g. of porcine or bovine origin) and the *Fusarium* protease described in WO89/06270, WO94/25583 and WO05/040372, and the chymotrypsin proteases derived from Cellumonas described in WO05/052161 and WO05/052146.

A further preferred protease is the alkaline protease from *Bacillus lentus* DSM 5483, as described for example in WO95/23221, and variants thereof which are described in WO92/21760, WO95/23221, EP1921147 and EP1921148.

Examples of metalloproteases are the neutral metalloprotease as described in WO07/044993 (Genencor Int.) such as those derived from *Bacillus amyloliquefaciens*.

Examples of useful proteases are the variants described in: WO92/19729, WO96/034946, WO98/20115, WO98/20116, WO99/011768, WO01/44452, WO03/006602, WO04/03186, WO04/041979, WO07/006305, WO11/036263, WO11/036264, especially the variants with substitutions in one or more of the following positions: 3, 4, 9, 15, 27, 36, 57, 68, 76, 87, 95, 96, 97, 98, 99, 100, 101, 102, 103, 104, 106, 118, 120, 123, 128, 129, 130, 160, 167, 170, 194, 195, 199, 205, 206, 217, 218, 222, 224, 232, 235, 236, 245, 248, 252 and 274 using the BPN' numbering. More preferred the subtilase variants may comprise the mutations: S3T, V41, S9R, A15T, K27R, *36D, V68A, N76D, N87S,R, *97E, A98S, S99G,D,A, S99AD, S101G,M,R S103A, V1041,Y,N, S106A, G118V,R, H120D,N, N123S, S128L, P129Q, S130A, G160D, Y167A, R170S, A194P, G195E, V199M, V2051, L217D, N218D, M222S, A232V, K235L, Q236H, Q245R, N252K, T274A (using BPN' numbering).

The protease may have an amino acid sequence with identity above 90%, above 95% or above 98% or be 100% identical to SEQ ID NO: 1 in the attached sequence listing, which differs from Savinase® by the substitutions S9R+A15T+V66A+N212D+Q239R.

Suitable commercially available protease enzymes include those sold under the trade names Alcalase®, Duralase™, Durazym™, Relase®, Relase® Ultra, Savinase®, Savinase® Ultra, Primase®, Polarzyme®, Kannase®, Liquanase®, Liquanase® Ultra, Ovozyme®, Coronase®, Coronase® Ultra, Blaze®, Neutrase®, Everlase® and Esperase® (Novozymes NS), those sold under the tradename Maxatase®, Maxacal®, Maxapem®, Purafect®, Purafect Prime®, Purafect MA®, Purafect Ox®, Purafect OxP®, Puramax®, Properase®, FN2®, FN3®, FN4®, Excellase®, Eraser®, Opticlean® and Optimase® (Danisco/DuPont), Axapem™ (Gist-Brocases N.V.), BLAP (sequence shown in FIG. 29 of U.S. Pat. No. 5,352,604) and variants hereof (Henkel AG) and KAP (*Bacillus alkalophilus* subtilisin) from Kao.

Lipases and Cutinases

Suitable lipases and cutinases include those of bacterial or fungal origin. Chemically modified or protein engineered mutant enzymes are included. Examples include lipase from *Thermomyces*, e.g. from *T. lanuginosus* (previously named *Humicola lanuginosa*) as described in EP258068 and EP305216, cutinase from *Humicola*, e.g. *H. insolens* (WO96/13580), lipase from strains of *Pseudomonas* (some of these now renamed to *Burkholderia*), e.g. *P. alcaligenes* or *P. pseudoalcaligenes* (EP218272), *P. cepacia* (EP331376), P. sp. strain SD705 (WO95/06720 & WO96/27002), *P. wisconsinensis* (WO96/12012), GDSL-type *Streptomyces* lipases (WO10/065455), cutinase from *Magnaporthe grisea* (WO10/107560), cutinase from *Pseudomonas mendocina* (U.S. Pat. No. 5,389,536), lipase from *Thermobifida fusca* (WO11/084412), *Geobacillus stearothermophilus* lipase (WO11/084417), lipase from *Bacillus subtilis* (WO11/084599), and lipase from *Streptomyces griseus* (WO11/150157) and *S. pristinaespiralis* (WO12/137147).

Other examples are lipase variants such as those described in EP407225, WO92/05249, WO94/01541, WO94/25578, WO95/14783, WO95/30744, WO95/35381, WO95/22615, WO96/00292, WO97/04079, WO97/07202, WO00/34450, WO00/60063, WO01/92502, WO07/87508 and WO09/109500.

Preferred commercial lipase products include include Lipolase™, Lipex™; Lipolex™ and Lipoclean™ (Novozymes NS), Lumafast (originally from Genencor) and Lipomax (originally from Gist-Brocades).

Still other examples are lipases sometimes referred to as acyltransferases or perhydrolases, e.g. acyltransferases with homology to *Candida antarctica* lipase A (WO10/111143), acyltransferase from *Mycobacterium smegmatis* (WO05/56782), perhydrolases from the CE 7 family (WO09/67279), and variants of the *M. smegmatis* perhydrolase in particular the S54V variant used in the commercial product Gentle Power Bleach from Huntsman Textile Effects Pte Ltd (WO10/100028).

Amylases

Suitable amylases may be an alpha-amylase or a glucoamylase and may be of bacterial or fungal origin. Chemically modified or protein engineered mutants are included. Amylases include, for example, alpha-amylases obtained from Bacillus, e.g., a special strain of Bacillus licheniformis, described in more detail in GB 1,296,839.

Suitable amylases include amylases having SEQ ID NO: 2 in WO 95/10603 or variants having 90% sequence identity to SEQ ID NO: 3 thereof. Preferred variants are described in WO 94/02597, WO 94/18314, WO 97/43424 and SEQ ID NO: 4 of WO 99/019467, such as variants with substitutions in one or more of the following positions: 15, 23, 105, 106, 124, 128, 133, 154, 156, 178, 179, 181, 188, 190, 197, 201, 202, 207, 208, 209, 211, 243, 264, 304, 305, 391, 408, and 444.

Different suitable amylases include amylases having SEQ ID NO: 6 in WO 02/010355 or variants thereof having 90% sequence identity to SEQ ID NO: 6. Preferred variants of SEQ ID NO: 6 are those having a deletion in positions 181 and 182 and a substitution in position 193. Other amylases which are suitable are hybrid alpha-amylase comprising residues 1-33 of the alpha-amylase derived from B. amyloliquefaciens shown in SEQ ID NO: 6 of WO 2006/066594 and residues 36-483 of the B. licheniformis alpha-amylase shown in SEQ ID NO: 4 of WO 2006/066594 or variants having 90% sequence identity thereof. Preferred variants of this hybrid alpha-amylase are those having a substitution, a deletion or an insertion in one of more of the following positions: G48, T49, G107, H156, A181, N190, M197, I201, A209 and Q264. Most preferred variants of the hybrid alpha-amylase comprising residues 1-33 of the alpha-amylase derived from B. amyloliquefaciens shown in SEQ ID NO: 6 of WO 2006/066594 and residues 36-483 of SEQ ID NO: 4 are those having the substitutions:
M197T;
H156Y+A181T+N190F+A209V+Q264S; or
G48A+T49I+G107A+H156Y+A181T+N190F+I201F+A209V+Q264S.

Further amylases which are suitable are amylases having SEQ ID NO: 6 in WO 99/019467 or variants thereof having 90% sequence identity to SEQ ID NO: 6. Preferred variants of SEQ ID NO: 6 are those having a substitution, a deletion or an insertion in one or more of the following positions: R181, G182, H183, G184, N195, I206, E212, E216 and K269. Particularly preferred amylases are those having deletion in positions R181 and G182, or positions H183 and G184. Additional amylases which can be used are those having SEQ ID NO: 1, SEQ ID NO: 3, SEQ ID NO: 2 or SEQ ID NO: 7 of WO 96/023873 or variants thereof having 90% sequence identity to SEQ ID NO: 1, SEQ ID NO: 2, SEQ ID NO: 3 or SEQ ID NO: 7. Preferred variants of SEQ ID NO: 1, SEQ ID NO: 2, SEQ ID NO: 3 or SEQ ID NO: 7 are those having a substitution, a deletion or an insertion in one or more of the following positions: 140, 181, 182, 183, 184, 195, 206, 212, 243, 260, 269, 304 and 476, using SEQ ID 2 of WO 96/023873 for numbering. More preferred variants are those having a deletion in two positions selected from 181, 182, 183 and 184, such as 181 and 182, 182 and 183, or positions 183 and 184. Most preferred amylase variants of SEQ ID NO: 1, SEQ ID NO: 2 or SEQ ID NO: 7 are those having a deletion in positions 183 and 184 and a substitution in one or more of positions 140, 195, 206, 243, 260, 304 and 476.

Other amylases which can be used are amylases having SEQ ID NO: 2 of WO 08/153815, SEQ ID NO: 10 in WO 01/66712 or variants thereof having 90% sequence identity to SEQ ID NO: 2 of WO 08/153815 or 90% sequence identity to SEQ ID NO: 10 in WO 01/66712. Preferred variants of SEQ ID NO: 10 in WO 01/66712 are those having a substitution, a deletion or an insertion in one of more of the following positions: 176, 177, 178, 179, 190, 201, 207, 211 and 264.

Further suitable amylases are amylases having SEQ ID NO: 2 of WO 09/061380 or variants having 90% sequence identity to SEQ ID NO: 2 thereof. Preferred variants of SEQ ID NO: 2 are those having a truncation of the C-terminus and/or a substitution, a deletion or an insertion in one of more of the following positions: Q87, Q98, S125, N128, T131, T165, K178, R180, S181, T182, G183, M201, F202, N225, S243, N272, N282, Y305, R309, D319, Q320, Q359, K444 and G475. More preferred variants of SEQ ID NO: 2 are those having the substitution in one of more of the following positions: Q87E,R, Q98R, S125A, N128C, T131I, T165I, K178L, T182G, M201L, F202Y, N225E,R, N272E,R, S243Q,A,E,D, Y305R, R309A, Q320R, Q359E, K444E and G475K and/or deletion in position R180 and/or S181 or of T182 and/or G183. Most preferred amylase variants of SEQ ID NO: 2 are those having the substitutions:
N128C+K178L+T182G+Y305R+G475K;
N128C+K178L+T182G+F202Y+Y305R+D319T+G475K;
S125A+N128C+K178L+T182G+Y305R+G475K; or
S125A+N128C+T131I+T165I+K178L+T182G+Y305R+G475K wherein the variants are C-terminally truncated and optionally further comprises a substitution at position 243 and/or a deletion at position 180 and/or position 181.

Further suitable amylases are amylases having SEQ ID NO: 1 of WO13184577 or variants having 90% sequence identity to SEQ ID NO: 1 thereof. Preferred variants of SEQ ID NO: 1 are those having a substitution, a deletion or an insertion in one of more of the following positions: K176, R178, G179, T180, G181, E187, N192, M199, I203, S241, R458, T459, D460, G476 and G477. More preferred variants of SEQ ID NO: 1 are those having the substitution in one of more of the following positions: K176L, E187P, N192FYH, M199L, I203YF, S241QADN, R458N, T459S, D460T, G476K and G477K and/or deletion in position R178 and/or S179 or of T180 and/or G181. Most preferred amylase variants of SEQ ID NO: 1 are those having the substitutions:
E187P+I203Y+G476K
E187P+I203Y+R458N+T459S+D460T+G476K
wherein the variants optionally further comprises a substitution at position 241 and/or a deletion at position 178 and/or position 179.

Further suitable amylases are amylases having SEQ ID NO: 1 of WO10104675 or variants having 90% sequence identity to SEQ ID NO: 1 thereof. Preferred variants of SEQ ID NO: 1 are those having a substitution, a deletion or an insertion in one of more of the following positions: N21, D97, V128 K177, R179, S180, I181, G182, M200, L204, E242, G477 and G478. More preferred variants of SEQ ID NO: 1 are those having the substitution in one of more of the following positions: N21D, D97N, V128I K177L, M200L, L204YF, E242QA, G477K and G478K and/or deletion in position R179 and/or S180 or of I181 and/or G182. Most preferred amylase variants of SEQ ID NO: 1 are those having the substitutions:
N21D+D97N+V128I
wherein the variants optionally further comprises a substitution at position 200 and/or a deletion at position 180 and/or position 181.

Other suitable amylases are the alpha-amylase having SEQ ID NO: 12 in WO01/66712 or a variant having at least 90% sequence identity to SEQ ID NO: 12. Preferred amylase variants are those having a substitution, a deletion or an insertion in one of more of the following positions of SEQ ID NO: 12 in WO01/66712: R28, R118, N174; R181, G182, D183, G184, G186, W189, N195, M202, Y298, N299, K302, S303, N306, R310, N314; R320, H324, E345, Y396, R400, W439, R444, N445, K446, Q449, R458, N471, N484. Particular preferred amylases include variants having a deletion of D183 and G184 and having the substitutions R118K, N195F, R320K and R458K, and a variant additionally having substitutions in one or more position selected from the group: M9, G149, G182, G186, M202, T257, Y295, N299, M323, E345 and A339, most preferred a variant that additionally has substitutions in all these positions. Other examples are amylase variants such as those described in WO2011/098531, WO2013/001078 and WO2013/001087.

Commercially available amylases are Duramyl™, Termamyl™, Fungamyl™, Stainzyme™, Stainzyme Plus™, Natalase™, Liquozyme X and BAN™ (from Novozymes NS), and Rapidase™, Purastar™/Effectenz™, Powerase, Preferenz S1000, Preferenz S100 and Preferenz S110 (from Genencor International Inc./DuPont).

Peroxidases/Oxidases

Suitable peroxidases/oxidases include those of plant, bacterial or fungal origin. Chemically modified or protein engineered mutants are included. Examples of useful peroxidases include peroxidases from *Coprinus*, e.g., from *C. cinereus*, and variants thereof as those described in WO 93/24618, WO 95/10602, and WO 98/15257. Commercially available peroxidases include Guardzyme™ (Novozymes NS).

The peroxidase may be an enzyme comprised by the enzyme classification EC 1.11.1.7, as set out by the Nomenclature Committee of the International Union of Biochemistry and Molecular Biology (IUBMB), or any fragment derived therefrom, exhibiting peroxidase activity. The peroxidase may also be a haloperoxidase enzyme, such as chloroperoxidase, bromoperoxidase and compounds exhibiting chloroperoxidase or bromoperoxidase activity. Haloperoxidases are classified according to their specificity for halide ions. Chloroperoxidases (E.C. 1.11.1.10) catalyze formation of hypochlorite from chloride ions.

Suitable peroxidases include those of plant, bacterial or fungal origin. Chemically modified or protein engineered mutants are included. Examples of useful peroxidases include peroxidases from *Coprinopsis*, e.g., from *C. cinerea* (EP 179,486), and variants thereof as those described in WO 93/24618, WO 95/10602, and WO 98/15257.

In an embodiment, the haloperoxidase of the invention is a chloroperoxidase. Preferably, the haloperoxidase is a vanadium haloperoxidase, i.e., a vanadate-containing haloperoxidase. In a preferred method of the present invention the vanadate-containing haloperoxidase is combined with a source of chloride ion.

Haloperoxidases have been isolated from many different fungi, in particular from the fungus group dematiaceous hyphomycetes, such as *Caldariomyces*, e.g., *C. fumago, Alternaria, Curvularia*, e.g., *C. verruculosa* and *C. inaequalis, Drechslera, Ulocladium* and *Botrytis*. Haloperoxidases have also been isolated from bacteria such as *Pseudomonas*, e.g., *P. pyrrocinia* and *Streptomyces*, e.g., *S. aureofaciens*.

In an preferred embodiment, the haloperoxidase is derivable from *Curvularia* sp., in particular *Curvularia verruculosa* or *Curvularia inaequalis*, such as *C. inaequalis* CBS 102.42 as described in WO 95/27046; or *C. verruculosa* CBS 147.63 or *C. verruculosa* CBS 444.70 as described in WO 97/04102; or from *Drechslera hartlebii* as described in WO 01/79459, *Dendryphiella salina* as described in WO 01/79458, *Phaeotrichoconis crotalarie* as described in WO 01/79461, or *Geniculosporium* sp. as described in WO 01/79460.

An oxidase according to the invention include, in particular, any laccase enzyme comprised by the enzyme classification EC 1.10.3.2, or any fragment derived therefrom exhibiting laccase activity, or a compound exhibiting a similar activity, such as a catechol oxidase (EC 1.10.3.1), an o-aminophenol oxidase (EC 1.10.3.4), or a bilirubin oxidase (EC 1.3.3.5).

Preferred laccase enzymes are enzymes of microbial origin. The enzymes may be derived from plants, bacteria or fungi (including filamentous fungi and yeasts).

Suitable examples from fungi include a laccase derivable from a strain of *Aspergillus, Neurospora*, e.g., *N. crassa, Podospora, Botrytis, Collybia, Fomes, Lentinus, Pleurotus, Trametes*, e.g., *T. villosa* and *T. versicolor, Rhizoctonia*, e.g., *R. solani, Coprinopsis*, e.g., *C. cinerea, C. comatus, C. friesii*, and *C. plicatilis, Psathyrella*, e.g., *P. condelleana, Panaeolus*, e.g., *P. papilionaceus, Myceliophthora*, e.g., *M. thermophila, Schytalidium*, e.g., *S. thermophilum, Polyporus*, e.g., *P. pinsitus, Phlebia*, e.g., *P. radiata* (WO 92/01046), or *Coriolus*, e.g., *C. hirsutus* (JP 2238885).

Suitable examples from bacteria include a laccase derivable from a strain of *Bacillus*.

A laccase derived from *Coprinopsis* or *Myceliophthora* is preferred; in particular a laccase derived from *Coprinopsis cinerea*, as disclosed in WO 97/08325; or from *Myceliophthora thermophila*, as disclosed in WO 95/33836.

Pectate Lyase

The pectate lyase may be a wild-type enzymes derived from *Bacillus*, particularly *B. lichemiformis* or *B. agaradhaerens*, or a variant derived of these, e.g. as described in U.S. Pat. No. 6,124,127, WO 1999/027083, WO 1999/027084, WO 2002/006442, WO 2002/092741, or WO 2003/095638.

Automatic Dishwash Detergent Composition

The co-granule of the invention may be used in a detergent formulated for use in an automatic dishwasher (ADW). The detergent (dishwashing composition) comprises a bleaching system, typically in an amount of 1-30% by weight, e.g. 5-20%.

The bleaching system comprises a source of hydrogen peroxide such as sodium percarbonate, sodium perborates and hydrogen peroxide-urea (1:1), preformed peracids and mixtures thereof. Suitable preformed peracids include, but are not limited to, peroxycarboxylic acids and salts, diperoxydicarboxylic acids, perimidic acids and salts, peroxymonosulfuric acids and salts, for example, Oxone®, and mixtures thereof. Non-limiting examples of bleaching systems include peroxide-based bleaching systems, which may comprise, for example, an inorganic salt, including alkali metal salts such as sodium salts of perborate (usually mono- or tetra-hydrate), percarbonate, persulfate, perphosphate, persilicate salts, in combination with a peracid-forming bleach activator.

The bleaching system may also comprise a bleach activator, i.e. a compound which reacts with hydrogen peroxide to form a peracid via perhydrolysis. The peracid thus formed constitutes the activated bleach. Suitable bleach activators to be used herein include those belonging to the class of esters, amides, imides or anhydrides. Suitable examples are tetraacetylethylenediamine (TAED), sodium 4-[(3,5,5-trimethylhexanoyl)oxy]benzene-1-sulfonate (ISONOBS), 4-(dodecanoyloxy)benzene-1-sulfonate (LOBS), 4-(decanoyloxy)benzene-1-sulfonate, 4-(decanoyloxy)benzoate (DOBS or DOBA), 4-(nonanoyloxy)benzene-1-sulfonate (NOBS), and/or those disclosed in WO98/17767.

The dish wash detergent generally comprises a builder, typically in an amount of 40-65%, particularly 50-65%. The builder may particularly be a chelating agent that forms water-soluble complexes with Ca and Mg. Non-limiting examples of builders include zeolites, diphosphates (pyrophosphates), triphosphates such as sodium triphosphate (STP or STPP), carbonates such as sodium carbonate, soluble silicates such as sodium metasilicate, layered silicates (e.g., SKS-6 from Hoechst), ethanolamines such as 2-aminoethan-1-ol (MEA), diethanolamine (DEA, also known as 2,2'-iminodiethan-1-ol), triethanolamine (TEA, also known as 2,2',2''-nitrilotriethan-1-ol), and (carboxymethyl)inulin (CMI), and combinations thereof.

Other examples of typical ingredients in dishwash detergent compositions are well-known to a person skilled in the art, and shown in the paragraphs below.

Surfactants

The dish washing composition can include at least one non-ionic surfactant. Suitable nonionic surfactants include, but are not limited to low-foaming nonionic (LFNI) surfactants. A LFNI surfactant is most typically used in an automatic dishwashing composition because of the improved water-sheeting action (especially from glassware) which they confer to the automatic dishwashing composition. They also may encompass non-silicone, phosphate or nonphosphate polymeric materials which are known to defoam food soils encountered in automatic dishwashing. The LFNI surfactant may have a relatively low cloud point and a high hydrophilic-lipophilic balance (HLB). Cloud points of 1% solutions in water are typically below about 32° C. and alternatively lower, e.g., 0° C., for optimum control of sudsing throughout a full range of water temperatures. If desired, a biodegradable LFNI surfactant having the above properties may be used.

A LFNI surfactant may include, but is not limited to: alkoxylated surfactants, especially ethoxylates derived from primary alcohols, and blends thereof with more sophisticated surfactants, such as the polyoxypropylene/polyoxyethylene/polyoxypropylene reverse block polymers. Suitable block polyoxyethylene-polyoxypropylene polymeric compounds that meet the requirements may include those based on ethylene glycol, propylene glycol, glycerol, trimethylolpropane and ethylenediamine, and mixtures thereof. Polymeric compounds made from a sequential ethoxylation and propoxylation of initiator compounds with a single reactive hydrogen atom, such as C 12-is aliphatic alcohols, do not generally provide satisfactory suds control in Automatic dishwashing compositions. However, certain of the block polymer surfactant compounds designated as PLURONIC® and TETRONIC® by the BASF-Wyandotte Corp., Wyandotte, Mich., are suitable in Automatic dishwashing compositions. The LFNI surfactant can optionally include a propylene oxide in an amount up to about 15% by weight. Other LFNI surfactants can be prepared by the processes described in U.S. Pat. No. 4,223,163. The LFNI surfactant may also be derived from a straight chain fatty alcohol containing from about 16 to about 20 carbon atoms (C16-C20 alcohol), alternatively a Ci8 alcohol, condensed with an average of from about 6 to about 15 moles, or from about 7 to about 12 moles, and alternatively, from about 7 to about 9 moles of ethylene oxide per mole of alcohol. The ethoxylated nonionic surfactant so derived may have a narrow ethoxylate distribution relative to the average.

In certain embodiments, a LFNI surfactant having a cloud point below 30° C. may be present in an amount from about 0.01% to about 60%, or from about 0.5% to about 10% by weight, and alternatively, from about 1% to about 5% by weight of the composition In preferred embodiments, the surfactant is a non-ionic surfactant or a non-ionic surfactant system having a phase inversion temperature, as measured at a concentration of 1% in distilled water, between 40 and 70° C., preferably between 45 and 65° C. By a "non-ionic surfactant system" is meant herein a mixture of two or more non-ionic surfactants. Preferred for use herein are non-ionic surfactant systems. They seem to have improved cleaning and finishing properties and stability in product than single non-ionic surfactants.

Suitable nonionic surfactants include: i) ethoxylated non-ionic surfactants prepared by the reaction of a monohydroxy alkanol or alkyphenol with 6 to 20 carbon atoms with preferably at least 12 moles particularly preferred at least 16 moles, and still more preferred at least 20 moles of ethylene oxide per mole of alcohol or alkylphenol; ii) alcohol alkoxylated surfactants having a from 6 to 20 carbon atoms and at least one ethoxy and propoxy group. Preferred for use herein are mixtures of surfactants i) and ii).

Another suitable non-ionic surfactants are epoxy-capped poly(oxyalkylated) alcohols represented by the formula:

$$R_1O[CH_2CH(CH_3)O]_x[CH_2CH_2O]_y[CH_2CH(OH)R_2] \quad (I)$$

wherein $R_1$ is a linear or branched, aliphatic hydrocarbon radical having from 4 to 18 carbon atoms; $R_2$ is a linear or branched aliphatic hydrocarbon radical having from 2 to 26 carbon atoms; x is an integer having an average value of from 0.5 to 1.5, more preferably about 1; and y is an integer having a value of at least 15, more preferably at least 20.

Preferably, the surfactant of formula I has at least about 10 carbon atoms in the terminal epoxide unit $[CH_2CH(OH)R_2]$. Suitable surfactants of formula I are Olin Corporation's POLY-TERGENT® SLF-18B nonionic surfactants, as described, for example, in WO 94/22800, published Oct. 13, 1994 by Olin Corporation.

Preferably non-ionic surfactants and/or system herein have a Draves wetting time of less than 360 seconds, preferably less than 200 seconds, more preferably less than 100 seconds and especially less than 60 seconds as measured by the Draves wetting method (standard method ISO 8022 using the following conditions; 3-g hook, 5-g cotton skein, 0.1% by weight aqueous solution at a temperature of 25° C.). Amine oxides surfactants are also useful in the present invention as anti-redeposition surfactants include linear and branched compounds having the formula:

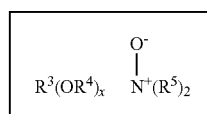

wherein $R^3$ is selected from an alkyl, hydroxyalkyl, acylamidopropoyl and alkyl phenyl group, or mixtures thereof, containing from 8 to 26 carbon atoms, preferably 8 to 18 carbon atoms; $R^4$ is an alkylene or hydroxyalkylene group containing from 2 to 3 carbon atoms, preferably 2 carbon atoms, or mixtures thereof; x is from 0 to 5, preferably from 0 to 3; and each $R^5$ is an alkyl or hydroxyalkyl group containing from 1 to 3, preferably from 1 to 2 carbon atoms, or a polyethylene oxide group containing from 1 to 3, preferable 1, ethylene oxide groups. The $R^5$ groups can be attached to each other, e.g., through an oxygen or nitrogen atom, to form a ring structure.

These amine oxide surfactants in particular include $C_{10}$-$C_{18}$ alkyl dimethyl amine oxides and $C_8$-$C_{18}$ alkoxy ethyl dihydroxyethyl amine oxides. Examples of such materials include dimethyloctylamine oxide, diethyldecylamine oxide, bis-(2-hydroxyethyl)dodecylamine oxide, dimethyldodecylamine oxide, dipropyltetradecylamine oxide, methylethylhexadecylamine oxide, dodecylamidopropyl dimethylamine oxide, cetyl dimethylamine oxide, stearyl dimethylamine oxide, tallow dimethylamine oxide and dimethyl-2-hydroxyoctadecylamine oxide. Preferred are $C_{10}$-$C_{18}$ alkyl dimethylamine oxide, and $C_{10}$-$C_{18}$ acylamido alkyl dimethylamine oxide. Surfactants and especially non-ionic surfactants may be present in amounts from 0 to 10% by weight, preferably from 0.1% to 10%, and most preferably from 0.25% to 6%.

Sulfonated Polymer

The polymer, if used, is used in any suitable amount from about 0.1% to about 20%, preferably from 1% to about 15%, more preferably from 2% to 10% by weight of the composition. Sulfonated/carboxylated polymers are particularly suitable for the compositions contained in the pouch of the invention.

Suitable sulfonated/carboxylated polymers described herein may have a weight average molecular weight of less than or equal to about 100,000 Da, or less than or equal to about 75,000 Da, or less than or equal to about 50,000 Da, or from about 3,000 Da to about 50,000, preferably from about 5,000 Da to about 45,000 Da.

As noted herein, the sulfonated/carboxylated polymers may comprise (a) at least one structural unit derived from at least one carboxylic acid monomer having the general formula (I):

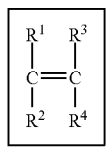

wherein $R^1$ to $R^4$ are independently hydrogen, methyl, carboxylic acid group or $CH_2COOH$ and wherein the carboxylic acid groups can be neutralized; (b) optionally, one or more structural units derived from at least one nonionic monomer having the general formula (II):

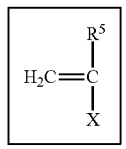

wherein $R^5$ i is hydrogen, $C_1$ to $C_6$ alkyl, or $C_1$ to $C_6$ hydroxyalkyl, and X is either aromatic (with $R^5$ being hydrogen or methyl when X is aromatic) or X is of the general formula (III):

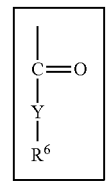

wherein $R^6$ is (independently of $R^5$) hydrogen, $C_1$ to $C_6$ alkyl, or $C_1$ to $C_6$ hydroxyalkyl, and Y is O or N; and at least one structural unit derived from at least one sulfonic acid monomer having the general formula (IV):

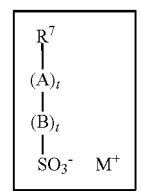

wherein $R^7$ is a group comprising at least one $sp^2$ bond, A is O, N, P, S or an amido or ester linkage, B is a mono- or polycyclic aromatic group or an aliphatic group, each t is independently 0 or 1, and $M^+$ is a cation. In one aspect, $R^7$ is a $C_2$ to $C_6$ alkene. In another aspect, $R^7$ is ethene, butene or propene.

Preferred carboxylic acid monomers include one or more of the following: acrylic acid, maleic acid, itaconic acid, methacrylic acid, or ethoxylate esters of acrylic acids, acrylic and methacrylic acids being more preferred. Preferred sulfonated monomers include one or more of the following: sodium (meth) allyl sulfonate, vinyl sulfonate, sodium phenyl (meth) allyl ether sulfonate, or 2-acrylamidomethyl propane sulfonic acid. Preferred non-ionic monomers include one or more of the following: methyl (meth) acrylate, ethyl (meth) acrylate, t-butyl (meth) acrylate, methyl (meth) acrylamide, ethyl (meth) acrylamide, t-butyl (meth) acrylamide, styrene, or [alpha]-methyl styrene.

Preferably, the polymer comprises the following levels of monomers: from about 40 to about 90%, preferably from about 60 to about 90% by weight of the polymer of one or more carboxylic acid monomer; from about 5 to about 50%, preferably from about 10 to about 40% by weight of the polymer of one or more sulfonic acid monomer; and optionally from about 1% to about 30%, preferably from about 2 to about 20% by weight of the polymer of one or more non-ionic monomer. An especially preferred polymer comprises about 70% to about 80% by weight of the polymer of at least one carboxylic acid monomer and from about 20% to about 30% by weight of the polymer of at least one sulfonic acid monomer. 99

The carboxylic acid is preferably (meth)acrylic acid. The sulfonic acid monomer is preferably one of the following: 2-acrylamido methyl-1-propanesulfonic acid, 2-methacrylamido-2-methyl-1-propanesulfonic acid, 3-methacrylamido-2-hydroxypropanesulfonic acid, allysulfonic acid, methallysulfonic acid, allyloxybenzensulfonic acid, methallyloxybenzensulfonic acid, 2-hydroxy-3-(2-propenyloxy) propanesulfonic acid, 2-methyl-2-propene-1-sulfonic acid, styrene sulfonic acid, vinylsulfonic acid, 3-sulfopropyl acrylate, 3-sulfopropyl methacrylate, sulfomethylacrylamid, sulfomethylmethacrylamide, and water soluble salts thereof.

The unsaturated sulfonic acid monomer is most preferably 2-acrylamido-2-propanesulfonic acid (AMPS).

Preferred commercial available polymers include: Alcosperse 240, Aquatreat AR 540 and Aquatreat MPS supplied by Alco Chemical; Acumer 3100, Acumer 2000, Acusol 587G and Acusol 588G supplied by Rohm & Haas; Goodrich K-798, K-775 and K-797 supplied by BF Goodrich; and ACP 1042 supplied by ISP technologies Inc. Particularly preferred polymers are Acusol 587G and Acusol 588G supplied by Rohm & Haas.

In the polymers, all or some of the carboxylic or sulfonic acid groups can be present in neutralized form, i.e. the acidic hydrogen atom of the carboxylic and/or sulfonic acid group in some or all acid groups can be replaced with metal ions, preferably alkali metal ions and in particular with sodium ions.

Hydrotropes

A hydrotrope is a compound that solubilises hydrophobic compounds in aqueous solutions (or oppositely, polar substances in a non-polar environment). Typically, hydrotropes have both hydrophilic and a hydrophobic character (so-called amphiphilic properties as known from surfactants); however the molecular structure of hydrotropes generally do not favor spontaneous self-aggregation, see e.g. review by Hodgdon and Kaler (2007), Current Opinion in Colloid & Interface Science 12: 121-128. Hydrotropes do not display a critical concentration above which self-aggregation occurs as found for surfactants and lipids forming miceller, lamellar or other well defined meso-phases. Instead, many hydrotropes show a continuous-type aggregation process where the sizes of aggregates grow as concentration increases. However, many hydrotropes alter the phase behavior, stability, and colloidal properties of systems containing substances of polar and non-polar character, including mixtures of water, oil, surfactants, and polymers. Hydrotropes are classically used across industries from pharma, personal care, food, to technical applications. Use of hydrotropes in detergent compositions allow for example more concentrated formulations of surfactants (as in the process of compacting liquid detergents by removing water) without inducing undesired phenomena such as phase separation or high viscosity.

The detergent may contain 0-10% by weight, for example 0-5% by weight, such as about 0.5 to about 5%, or about 3% to about 5%, of a hydrotrope. Any hydrotrope known in the art for use in detergents may be utilized. Non-limiting examples of hydrotropes include sodium benzenesulfonate, sodium p-toluene sulfonate (STS), sodium xylene sulfonate (SXS), sodium cumene sulfonate (SCS), sodium cymene sulfonate, amine oxides, alcohols and polyglycolethers, sodium hydroxynaphthoate, sodium hydroxynaphthalene sulfonate, sodium ethylhexyl sulfate, and combinations thereof.

Builders and Co-Builders

The detergent composition may contain about 0-65% by weight, such as about 5% to about 50% of a detergent builder or co-builder, or a mixture thereof. In a dish wash detergent, the level of builder is typically 40-65%, particularly 50-65%. The builder and/or co-builder may particularly be a chelating agent that forms water-soluble complexes with Ca and Mg. Any builder and/or co-builder known in the art for use in ADW detergents may be utilized. Non-limiting examples of builders include zeolites, diphosphates (pyrophosphates), triphosphates such as sodium triphosphate (STP or STPP), carbonates such as sodium carbonate, soluble silicates such as sodium metasilicate, layered silicates (e.g., SKS-6 from Hoechst), ethanolamines such as 2-aminoethan-1-ol (MEA), diethanolamine (DEA, also known as 2,2'-iminodiethan-1-ol), triethanolamine (TEA, also known as 2,2',2"-nitrilotriethan-1-ol), and (carboxymethyl)inulin (CMI), and combinations thereof.

The detergent composition may also contain 0-50% by weight, such as about 5% to about 30%, of a detergent co-builder. The detergent composition may include include a co-builder alone, or in combination with a builder, for example a zeolite builder. Non-limiting examples of co-builders include homopolymers of polyacrylates or copolymers thereof, such as poly(acrylic acid) (PAA) or copoly (acrylic acid/maleic acid) (PAA/PMA). Further non-limiting examples include citrate, chelators such as aminocarboxylates, aminopolycarboxylates and phosphonates, and alkyl- or alkenylsuccinic acid. Additional specific examples include 2,2',2"-nitrilotriacetic acid (NTA), ethylenediaminetetraacetic acid (EDTA), diethylenetriaminepentaacetic acid (DTPA), iminodisuccinic acid (IDS), ethylenediamine-N,N'-disuccinic acid (EDDS), methylglycinediacetic acid (MGDA), glutamic acid-N,N-diacetic acid (GLDA), 1-hydroxyethane-1,1-diphosphonic acid (HEDP), ethylenediaminetetra(methylenephosphonic acid) (EDTMPA), diethylenetriaminepentakis(methylenephosphonic acid) (DTMPA or DTPMPA), N-(2-hydroxyethyl)iminodiacetic acid (EDG), aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl)-aspartic acid (SMAS), N-(2-sulfoethyl)-aspartic acid (SEAS), N-(2-sulfomethyl)-glutamic acid (SMGL), N-(2-sulfoethyl)-glutamic acid (SEGL), N-methyliminodiacetic acid (MIDA), α-alanine-N,N-diacetic acid (α-ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N,N-diacetic acid (TUDA) and sulfomethyl-N,N-diacetic acid (SMDA), N-(2-hydroxyethyl)ethylenediamine-N,N,N"-triacetic acid (HEDTA), diethanolglycine (DEG), diethylenetriamine penta(methylenephosphonic acid) (DTPMP), aminotris(methylenephosphonic acid) (ATMP), and combinations and salts thereof. Further exemplary builders and/or co-builders are described in, e.g., WO 09/102854, U.S. Pat. No. 5,977,053

Bleaching Systems

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated.

Alkali metal percarbonates, particularly sodium percarbonate are preferred perhydrates for use herein. The percarbonate is most preferably incorporated into the products in a coated form which provides in-product stability. A suitable coating material providing in product stability comprises mixed salt of a water-soluble alkali metal sulphate and carbonate. Such coatings together with coating processes have previously been described in GB 1,466,799. The weight ratio of the mixed salt coating material to percarbonate lies in the range from 1:200 to 1:4, more preferably from 1:99 to 1:9, and most preferably from 1:49 to 1:19. Preferably, the mixed salt is of sodium sulphate and sodium carbonate which has the general formula $Na_2SO_4 \cdot n.Na_2CO_3$ wherein n is from 0.1 to 3, preferably n is from 0.3 to 1.0 and most preferably n is from 0.2 to 0.5.

Another suitable coating material providing in product stability, comprises sodium silicate of $SiO_2$: $Na_2O$ ratio from 1.8:1 to 3.0:1, preferably L8:1 to 2.4:1, and/or sodium metasilicate, preferably applied at a level of from 2% to 10%, (normally from 3% to 5%) of SiO2 by weight of the inorganic perhydrate salt. Magnesium silicate can also be included in the coating. Coatings that contain silicate and borate salts or boric acids or other inorganics are also suitable.

Other coatings which contain waxes, oils, fatty soaps can also be used advantageously within the present invention.

Potassium peroxymonopersulfate is another inorganic perhydrate salt of utility herein. Typical organic bleaches are organic peroxyacids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. Mono- and diperazelaic acid, mono- and diperbrassylic acid, and Nphthaloylaminoperoxicaproic acid are also suitable herein. The diacyl peroxide, especially dibenzoyl peroxide, should preferably be present in the form of particles having a weight average diameter of from about 0.1 to about 100 microns, preferably from about 0.5 to about 30 microns, more preferably from about 1 to about 10 microns. Preferably, at least about 25%, more preferably at least about 50%, even more preferably at least about 75%, most preferably at least about 90%, of the particles are smaller than 10 microns, preferably smaller than 6 microns. Diacyl peroxides within the above particle size range have also been found to provide better stain removal especially from plastic dishware, while minimizing undesirable deposition and filming during use in automatic dishwashing machines, than larger diacyl peroxide particles. The preferred diacyl peroxide particle size thus allows the formulator to obtain good stain removal with a low level of diacyl peroxide, which reduces deposition and filming. Conversely, as diacyl peroxide particle size increases, more diacyl peroxide is needed for good stain removal, which increases deposition on surfaces encountered during the dishwashing process.

Further typical organic bleaches include the peroxy acids, particular examples being the alkylperoxy acids and the arylperoxy acids. Preferred representatives are (a) peroxybenzoic acid and its ring-substituted derivatives, such as alkylperoxybenzoic acids, but also peroxy-[alpha]-naphthoic acid and magnesium monoperphthalate, (b) the aliphatic or substituted aliphatic peroxy acids, such as peroxylauric acid, peroxystearic acid, [epsilon]-phthalimidoperoxycaproic acid [phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi(6-aminopercaproic acid).

Bleach Activators

Bleach activators are typically organic peracid precursors that enhance the bleaching action in the course of cleaning at temperatures of 60[deg.] C and below. Bleach activators suitable for use herein include compounds which, under perhydrolysis conditions, give aliphatic peroxoycarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC). Bleach activators if included in the compositions of the invention are in a level of from about 0.1 to about 10%, preferably from about 0.5 to about 2% by weight of the composition.

Bleach Catalysts

Bleach catalysts preferred for use herein include the manganese triazacyclononane, MnTACN and related complexes (U.S. Pat. Nos. 4,246,612, 5,227,084); Co, Cu, Mn and Fe bispyridylamine and related complexes (U.S. Pat. No. 5,114,611); and pentamine acetate cobalt(111) and related complexes (U.S. Pat. No. 4,810,410). A complete description of bleach catalysts suitable for use herein can be found in WO99/06521, pages 34, line 26 to page 40, line 16. Bleach catalyst if included in the compositions of the invention are in a level of from about 0.1 to about 10%, preferably from about 0.5 to about 2% by weight of the composition.

Oxidoreductases, for example oxidases, oxygenases, catalases, peroxidases such as halo-, chloro-, bromo-, lignin, glucose, or manganese peroxidases, dioxygenases, or laccases (phenoloxidases, polyphenoloxidases), can also be used according to the present invention to intensify the bleaching effect. Advantageously, preferably organic, particularly preferably aromatic compounds that interact with the enzymes are additionally added in order to enhance the activity of the relevant oxidoreductases (enhancers) or, if there is a large difference in redox potentials between the oxidizing enzymes and the stains, to ensure electron flow (mediators).

Silicates

Preferred silicates are sodium silicates such as sodium disilicate, sodium metasilicate and crystalline phyllosilicates. Silicates if present are at a level of from about 1 to about 20%, preferably from about 5 to about 15% by weight of composition.

Metal Care Agents

Metal care agents may prevent or reduce the tarnishing, corrosion or oxidation of metals, including aluminium, stainless steel and non-ferrous metals, such as silver and copper. Suitable examples include one or more of the following:

(a) benzatriazoles, including benzotriazole or bis-benzotriazole and substituted derivatives thereof. Benzotriazole derivatives are those compounds in which the available substitution sites on the aromatic ring are partially or completely substituted. Suitable substituents include linear or branch-chain Ci-C20-alkyl groups and hydroxyl, thio, phenyl or halogen such as fluorine, chlorine, bromine and iodine.

(b) metal salts and complexes chosen from the group consisting of zinc, manganese, titanium, zirconium, hafnium, vanadium, cobalt, gallium and cerium salts and/or complexes, the metals being in one of the oxidation states II, III, IV, V or VI. In one aspect, suitable metal salts and/or metal complexes may be chosen from the group consisting of Mn(II) sulphate, Mn(II) citrate, Mn(II) stearate, Mn(II)

acetylacetonate, K^TiF6, K^ZrF6, CoSO4, Co(NOs)2 and Ce(NOs)3, zinc salts, for example zinc sulphate, hydrozincite or zinc acetate;

(c) silicates, including sodium or potassium silicate, sodium disilicate, sodium metasilicate, crystalline phyllosilicate and mixtures thereof.

Further suitable organic and inorganic redox-active substances that act as silver/copper corrosion inhibitors are disclosed in WO 94/26860 and WO 94/26859.

Preferably the composition of the invention comprises from 0.1 to 5% by weight of the composition of a metal care agent, preferably the metal care agent is a zinc salt.

Polymers

The detergent may contain 0-10% by weight, such as 0.5-5%, 2-5%, 0.5-2% or 0.2-1% of a polymer. Any polymer known in the art for use in detergents may be utilized. The polymer may function as a co-builder as mentioned above, or may provide antiredeposition, fiber protection, soil release, dye transfer inhibition, grease cleaning and/or antifoaming properties. Some polymers may have more than one of the above-mentioned properties and/or more than one of the below-mentioned motifs. Exemplary polymers include (carboxymethyl)cellulose (CMC), poly(vinyl alcohol) (PVA), poly(vinylpyrrolidone) (PVP), poly(ethyleneglycol) or poly(ethylene oxide) (PEG), ethoxylated poly (ethyleneimine), carboxymethyl inulin (CMI), and polycarboxylates such as PAA, PAA/PMA, poly-aspartic acid, and lauryl methacrylate/acrylic acid copolymers, hydrophobically modified CMC (HM-CMC) and silicones, copolymers of terephthalic acid and oligomeric glycols, copolymers of poly(ethylene terephthalate) and poly (oxyethene terephthalate) (PET-POET), PVP, poly(vinylimidazole) (PVI), poly(vinylpyridine-N-oxide) (PVPO or PVPNO) and polyvinylpyrrolidone-vinylimidazole (PVPVI). Further exemplary polymers include sulfonated polycarboxylates, polyethylene oxide and polypropylene oxide (PEO-PPO) and diquaternium ethoxy sulfate. Other exemplary polymers are disclosed in, e.g., WO 2006/130575. Salts of the above-mentioned polymers are also contemplated.

Enzymes

The detergent additive as well as the detergent composition may comprise one or more [additional] enzymes such as a protease, lipase, cutinase, an amylase, carbohydrase, cellulase, pectinase, mannanase, arabinase, galactanase, xylanase, oxidase, e.g., a laccase, and/or peroxidase.

In general, the properties of the selected enzyme(s) should be compatible with the selected detergent, (i.e., pH-optimum, compatibility with other enzymatic and non-enzymatic ingredients, etc.), and the enzyme(s) should be present in effective amounts.

Cellulases

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259.

Especially suitable cellulases are the alkaline or neutral cellulases having colour care benefits. Examples of such cellulases are cellulases described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307 and WO99/001544.

Other cellulases are endo-beta-1,4-glucanase enzyme having a sequence of at least 97% identity to the amino acid sequence of position 1 to position 773 of SEQ ID NO:2 of WO 2002/099091 or a family 44 xyloglucanase, which a xyloglucanase enzyme having a sequence of at least 60% identity to positions 40-559 of SEQ ID NO: 2 of WO 2001/062903.

Commercially available cellulases include Celluzyme™, and Carezyme™ (Novozymes NS) Carezyme Premium™ (Novozymes NS), Celluclean™ (Novozymes NS), Celluclean Classic™ (Novozymes NS), Cellusoft™ (Novozymes NS), Whitezyme™ (Novozymes NS), Clazinase™ and Puradax HA™ (Genencor International Inc.), and KAC-500(B)™ (Kao Corporation).

Proteases

Suitable proteases include those of bacterial, fungal, plant, viral or animal origin e.g. vegetable or microbial origin. Microbial origin is preferred. Chemically modified or protein engineered mutants are included. It may be an alkaline protease, such as a serine protease or a metalloprotease. A serine protease may for example be of the S1 family, such as trypsin, or the S8 family such as subtilisin. A metalloproteases protease may for example be a thermolysin from e.g. family M4 or other metalloprotease such as those from M5, M7 or M8 families. The term "subtilases" refers to a sub-group of serine protease according to Siezen et al., Protein Engng. 4 (1991) 719-737 and Siezen et al. Protein Science 6 (1997) 501-523. Serine proteases are a subgroup of proteases characterized by having a serine in the active site, which forms a covalent adduct with the substrate. The subtilases may be divided into 6 sub-divisions, i.e. the Subtilisin family, the Thermitase family, the Proteinase K family, the Lantibiotic peptidase family, the Kexin family and the Pyrolysin family.

Examples of subtilases are those derived from *Bacillus* such as *Bacillus lentus, B. alkalophilus, B. subtilis, B. amyloliquefaciens, Bacillus pumilus* and *Bacillus gibsonii* described in; U.S. Pat. No. 7,262,042 and WO09/021867, and subtilisin *lentus*, subtilisin Novo, subtilisin Carlsberg, *Bacillus licheniformis*, subtilisin BPN', subtilisin 309, subtilisin 147 and subtilisin 168 described in WO89/06279 and protease PD138 described in (WO93/18140). Other useful proteases may be those described in WO92/175177, WO01/016285, WO02/026024 and WO02/016547. Examples of trypsin-like proteases are trypsin (e.g. of porcine or bovine origin) and the *Fusarium* protease described in WO89/06270, WO94/25583 and WO05/040372, and the chymotrypsin proteases derived from Cellumonas described in WO05/052161 and WO05/052146.

A further preferred protease is the alkaline protease from *Bacillus lentus* DSM 5483, as described for example in WO95/23221, and variants thereof which are described in WO92/21760, WO95/23221, EP1921147 and EP1921148.

Examples of metalloproteases are the neutral metalloprotease as described in WO07/044993 (Genencor Int.) such as those derived from *Bacillus amyloliquefaciens*.

Examples of useful proteases are the variants described in: WO92/19729, WO96/034946, WO98/20115, WO98/20116, WO99/011768, WO01/44452, WO03/006602, WO04/03186, WO04/041979, WO07/006305, WO11/036263, WO11/036264, especially the variants with substitutions in one or more of the following positions: 3, 4, 9, 15, 27, 36, 57, 68, 76, 87, 95, 96, 97, 98, 99, 100, 101, 102, 103, 104, 106, 118, 120, 123, 128, 129, 130, 160, 167, 170, 194, 195, 199, 205, 206, 217, 218, 222, 224, 232, 235, 236, 245, 248, 252 and 274 using the BPN' numbering. More preferred the subtilase variants may comprise the mutations: S3T, V41, S9R, A15T, K27R, *36D, V68A, N76D, N87S,R, *97E, A98S, S99G,D,A, S99AD, S101G,M,R S103A, V1041,Y,N, S106A, G118V,R, H120D,N, N123S, S128L, P129Q, S130A, G160D, Y167A, R170S, A194P, G195E, V199M, V2051, L217D, N218D, M222S, A232V, K235L, Q236H, Q245R, N252K, T274A (using BPN' numbering).

Suitable commercially available protease enzymes include those sold under the trade names Alcalase®, Duralase™, Durazym™, Relase®, Relase® Ultra, Savinase®, Savinase® Ultra, Primase®, Polarzyme®, Kannase®, Liquanase®, Liquanase® Ultra, Ovozyme®, Coronase®, Coronase® Ultra, Neutrase®, Everlase® and Esperase® (Novozymes NS), those sold under the tradename Maxatase®, Maxacal®, Maxapem®, Purafect®, Purafect Prime®, Preferenz™, Purafect MAO, Purafect Ox®, Purafect OxP®, Puramax®, Properase®, Effectenz™, FN2®, FN3®, FN4®, Excellase®, Opticlean® and Optimase® (Danisco/DuPont), Axapem™ (Gist-Brocases N.V.), BLAP (sequence shown in FIG. 29 of U.S. Pat. No. 5,352,604) and variants hereof (Henkel AG) and KAP (*Bacillus alkalophilus* subtilisin) from Kao.

Savinase® is marketed by NOVOZYMES NS. It is subtilisin 309 from B. *Lentus* and differs from BAALKP only in one position (N87S). Savinase® has the amino acid sequence SEQ ID NO: 18.

Lipases and Cutinases

Suitable lipases and cutinases include those of bacterial or fungal origin. Chemically modified or protein engineered mutant enzymes are included. Examples include lipase from *Thermomyces*, e.g. from *T. lanuginosus* (previously named *Humicola lanuginosa*) as described in EP258068 and EP305216, cutinase from *Humicola*, e.g. *H. insolens* (WO96/13580), lipase from strains of *Pseudomonas* (some of these now renamed to *Burkholderia*), e.g. *P. alcaligenes* or *P. pseudoalcaligenes* (EP218272), *P. cepacia* (EP331376), *P.* sp. strain SD705 (WO95/06720 & WO96/27002), *P. wisconsinensis* (WO96/12012), GDSL-type *Streptomyces* lipases (WO10/065455), cutinase from *Magnaporthe grisea* (WO10/107560), cutinase from *Pseudomonas mendocina* (U.S. Pat. No. 5,389,536), lipase from *Thermobifida fusca* (WO11/084412), *Geobacillus stearothermophilus* lipase (WO11/084417), lipase from *Bacillus subtilis* (WO11/084599), and lipase from *Streptomyces griseus* (WO11/150157) and *S. pristinaespiralis* (WO12/137147).

Other examples are lipase variants such as those described in EP407225, WO92/05249, WO94/01541, WO94/25578, WO95/14783, WO95/30744, WO95/35381, WO95/22615, WO96/00292, WO97/04079, WO97/07202, WO00/34450, WO00/60063, WO01/92502, WO07/87508 and WO09/109500.

Preferred commercial lipase products include include Lipolase™, Lipex™; Lipolex™ and Lipoclean™ (Novozymes NS), Lumafast (originally from Genencor) and Lipomax (originally from Gist-Brocades).

Still other examples are lipases sometimes referred to as acyltransferases or perhydrolases, e.g. acyltransferases with homology to *Candida antarctica* lipase A (WO10/111143), acyltransferase from *Mycobacterium smegmatis* (WO05/56782), perhydrolases from the CE 7 family (WO09/67279), and variants of the *M. smegmatis* perhydrolase in particular the S54V variant used in the commercial product Gentle Power Bleach from Huntsman Textile Effects Pte Ltd (WO10/100028).

Amylases

Suitable amylases which can be used together with the enzyme preparation of the invention may be an alpha-amylase or a glucoamylase and may be of bacterial or fungal origin.

Chemically modified or protein engineered mutants are included. Amylases include, for example, alpha-amylases obtained from *Bacillus*, e.g., a special strain of *Bacillus licheniformis*, described in more detail in GB 1,296,839.

Suitable amylases include amylases having SEQ ID NO: 2 in WO 95/10603 or variants having 90% sequence identity to SEQ ID NO: 3 thereof. Preferred variants are described in WO 94/02597, WO 94/18314, WO 97/43424 and SEQ ID NO: 4 of WO 99/019467, such as variants with substitutions in one or more of the following positions: 15, 23, 105, 106, 124, 128, 133, 154, 156, 178, 179, 181, 188, 190, 197, 201, 202, 207, 208, 209, 211, 243, 264, 304, 305, 391, 408, and 444.

Different suitable amylases include amylases having SEQ ID NO: 6 in WO 02/010355 or variants thereof having 90% sequence identity to SEQ ID NO: 6. Preferred variants of SEQ ID NO: 6 are those having a deletion in positions 181 and 182 and a substitution in position 193. Other amylases which are suitable are hybrid alpha-amylase comprising residues 1-33 of the alpha-amylase derived from *B. amyloliquefaciens* shown in SEQ ID NO: 6 of WO 2006/066594 and residues 36-483 of the *B. licheniformis* alpha-amylase shown in SEQ ID NO: 4 of WO 2006/066594 or variants having 90% sequence identity thereof. Preferred variants of this hybrid alpha-amylase are those having a substitution, a deletion or an insertion in one of more of the following positions: G48, T49, G107, H156, A181, N190, M197, 1201, A209 and Q264. Most preferred variants of the hybrid alpha-amylase comprising residues 1-33 of the alpha-amylase derived from *B. amyloliquefaciens* shown in SEQ ID NO: 6 of WO 2006/066594 and residues 36-483 of SEQ ID NO: 4 are those having the substitutions:

M197T;
H156Y+A181T+N190F+A209V+Q264S; or
G48A+T49I+G107A+H156Y+A181T+N190F+1201F+
A209V+Q264S.

Further amylases which are suitable are amylases having SEQ ID NO: 6 in WO 99/019467 or variants thereof having 90% sequence identity to SEQ ID NO: 6. Preferred variants of SEQ ID NO: 6 are those having a substitution, a deletion or an insertion in one or more of the following positions: R181, G182, H183, G184, N195, 1206, E212, E216 and K269. Particularly preferred amylases are those having deletion in positions R181 and G182, or positions H183 and G184. Additional amylases which can be used are those having SEQ ID NO: 1, SEQ ID NO: 3, SEQ ID NO: 2 or SEQ ID NO: 7 of WO 96/023873 or variants thereof having 90% sequence identity to SEQ ID NO: 1, SEQ ID NO: 2, SEQ ID NO: 3 or SEQ ID NO: 7. Preferred variants of SEQ ID NO: 1, SEQ ID NO: 2, SEQ ID NO: 3 or SEQ ID NO: 7 are those having a substitution, a deletion or an insertion in one or more of the following positions: 140, 181, 182, 183, 184, 195, 206, 212, 243, 260, 269, 304 and 476, using SEQ ID 2 of WO 96/023873 for numbering. More preferred variants are those having a deletion in two positions selected from 181, 182, 183 and 184, such as 181 and 182, 182 and 183, or positions 183 and 184. Most preferred amylase variants of SEQ ID NO: 1, SEQ ID NO: 2 or SEQ ID NO: 7 are those having a deletion in positions 183 and 184 and a substitution in one or more of positions 140, 195, 206, 243, 260, 304 and 476.

Other amylases which can be used are amylases having SEQ ID NO: 2 of WO 08/153815, SEQ ID NO: 10 in WO 01/66712 or variants thereof having 90% sequence identity to SEQ ID NO: 2 of WO 08/153815 or 90% sequence identity to SEQ ID NO: 10 in WO 01/66712. Preferred variants of SEQ ID NO: 10 in WO 01/66712 are those having a substitution, a deletion or an insertion in one of more of the following positions: 176, 177, 178, 179, 190, 201, 207, 211 and 264.

Further suitable amylases are amylases having SEQ ID NO: 2 of WO 09/061380 or variants having 90% sequence identity to SEQ ID NO: 2 thereof. Preferred variants of SEQ ID NO: 2 are those having a truncation of the C-terminus and/or a substitution, a deletion or an insertion in one of more of the following positions: Q87, Q98, S125, N128, T131, T165, K178, R180, S181, T182, G183, M201, F202, N225, S243, N272, N282, Y305, R309, D319, Q320, Q359, K444 and G475. More preferred variants of SEQ ID NO: 2 are those having the substitution in one of more of the following positions: Q87E,R, Q98R, S125A, N128C, T131I, T165I, K178L, T182G, M201L, F202Y, N225E,R, N272E,R, S243Q,A,E,D, Y305R, R309A, Q320R, Q359E, K444E and G475K and/or deletion in position R180 and/or S181 or of T182 and/or G183. Most preferred amylase variants of SEQ ID NO: 2 are those having the substitutions: N128C+K178L+T182G+Y305R+G475K; N128C+K178L+T182G+F202Y+Y305R+D319T+G475K; S125A+N128C+K178L+T182G+Y305R+G475K; or S125A+N128C+T131I+T165I+K178L+T182G+Y305R+ G475K wherein the variants are C-terminally truncated and optionally further comprises a substitution at position 243 and/or a deletion at position 180 and/or position 181.

Other suitable amylases are the alpha-amylase having SEQ ID NO: 12 in WO01/66712 or a variant having at least 90% sequence identity to SEQ ID NO: 12. Preferred amylase variants are those having a substitution, a deletion or an insertion in one of more of the following positions of SEQ ID NO: 12 in WO01/66712: R28, R118, N174; R181, G182, D183, G184, G186, W189, N195, M202, Y298, N299, K302, S303, N306, R310, N314; R320, H324, E345, Y396, R400, W439, R444, N445, K446, Q449, R458, N471, N484. Particular preferred amylases include variants having a deletion of D183 and G184 and having the substitutions R118K, N195F, R320K and R458K, and a variant additionally having substitutions in one or more position selected from the group: M9, G149, G182, G186, M202, T257, Y295, N299, M323, E345 and A339, most preferred a variant that additionally has substitutions in all these positions. Other examples are amylase variants such as those described in WO2011/098531, WO2013/001078 and WO2013/001087.

Commercially available amylases are Duramyl™, Termamyl™, Fungamyl™, Stainzyme™, Stainzyme Plus™, Natalase™, Liquozyme X and BAN™ (from Novozymes NS), and Rapidase™, Purastar™/Effectenz™, Powerase and Preferenz S100 (from Genencor International Inc./DuPont).

Peroxidases/Oxidases

A peroxidase according to the invention is a peroxidase enzyme comprised by the enzyme classification EC 1.11.1.7, as set out by the Nomenclature Committee of the International Union of Biochemistry and Molecular Biology (IUBMB), or any fragment derived therefrom, exhibiting peroxidase activity.

Suitable peroxidases include those of plant, bacterial or fungal origin. Chemically modified or protein engineered mutants are included. Examples of useful peroxidases include peroxidases from *Coprinopsis*, e.g., from *C. cinerea* (EP 179,486), and variants thereof as those described in WO 93/24618, WO 95/10602, and WO 98/15257.

A peroxidase according to the invention also includes a haloperoxidase enzyme, such as chloroperoxidase, bromoperoxidase and compounds exhibiting chloroperoxidase or bromoperoxidase activity. Haloperoxidases are classified according to their specificity for halide ions. Chloroperoxidases (E.C. 1.11.1.10) catalyze formation of hypochlorite from chloride ions. In an embodiment, the haloperoxidase of the invention is a chloroperoxidase. Preferably, the haloperoxidase is a vanadium haloperoxidase, i.e., a vanadate-containing haloperoxidase. In a preferred method of the present invention the vanadate-containing haloperoxidase is combined with a source of chloride ion.

Haloperoxidases have been isolated from many different fungi, in particular from the fungus group dematiaceous hyphomycetes, such as *Caldariomyces*, e.g., *C. fumago, Alternaria, Curvularia*, e.g., *C. verruculosa* and *C. inaequalis, Drechslera*, Ulocladium and *Botrytis*. Haloperoxidases have also been isolated from bacteria such as *Pseudomonas*, e.g., *P. pyrrocinia* and *Streptomyces*, e.g., *S. aureofaciens*.

In an preferred embodiment, the haloperoxidase is derivable from *Curvularia* sp., in particular *Curvularia verruculosa* or *Curvularia inaequalis*, such as *C. inaequalis* CBS 102.42 as described in WO 95/27046; or *C. verruculosa* CBS 147.63 or *C. verruculosa* CBS 444.70 as described in WO 97/04102; or from *Drechslera hartlebii* as described in WO 01/79459, *Dendryphiella salina* as described in WO 01/79458, *Phaeotrichoconis crotalarie* as described in WO 01/79461, or *Geniculosporium* sp. as described in WO 01/79460.

An oxidase according to the invention include, in particular, any laccase enzyme comprised by the enzyme classification EC 1.10.3.2, or any fragment derived therefrom exhibiting laccase activity, or a compound exhibiting a similar activity, such as a catechol oxidase (EC 1.10.3.1), an o-aminophenol oxidase (EC 1.10.3.4), or a bilirubin oxidase (EC 1.3.3.5).

Preferred laccase enzymes are enzymes of microbial origin. The enzymes may be derived from plants, bacteria or fungi (including filamentous fungi and yeasts).

Suitable examples from fungi include a laccase derivable from a strain of *Aspergillus, Neurospora*, e.g., *N. crassa, Podospora, Botrytis, Collybia, Fomes, Lentinus, Pleurotus, Trametes*, e.g., *T. villosa* and *T. versicolor, Rhizoctonia*, e.g., *R. solani, Coprinopsis*, e.g., *C. cinerea, C. comatus, C. friesii*, and *C. plicatilis, Psathyrella*, e.g., *P. condelleana, Panaeolus*, e.g., *P. papilionaceus, Myceliophthora*, e.g., *M. thermophila, Schytalidium*, e.g., *S. thermophilum, Polyporus*, e.g., *P. pinsitus, Phlebia*, e.g., *P. radiata* (WO 92/01046), or *Coriolus*, e.g., *C. hirsutus* (JP 2238885).

Suitable examples from bacteria include a laccase derivable from a strain of *Bacillus*. A laccase derived from *Coprinopsis* or *Myceliophthora* is preferred; in particular a laccase derived from *Coprinopsis cinerea*, as disclosed in WO 97/08325; or from *Myceliophthora thermophila*, as disclosed in WO 95/33836.

The detergent enzyme(s) may be included in a detergent composition by adding separate additives containing one or more enzymes, or by adding a combined additive comprising all of these enzymes. A detergent additive of the invention, i.e., a separate additive or a combined additive, can be formulated, for example, as a granulate, liquid, slurry, etc. Preferred detergent additive formulations are granulates, in particular non-dusting granulates, liquids, in particular stabilized liquids, or slurries.

Non-dusting granulates may be produced, e.g. as disclosed in U.S. Pat. Nos. 4,106,991 and 4,661,452 and may optionally be coated by methods known in the art. Examples of waxy coating materials are poly(ethylene oxide) products (polyethyleneglycol, PEG) with mean molar weights of 1000 to 20000; ethoxylated nonylphenols having from 16 to 50 ethylene oxide units; ethoxylated fatty alcohols in which the alcohol contains from 12 to 20 carbon atoms and in which there are 15 to 80 ethylene oxide units; fatty alcohols; fatty acids; and mono- and di- and triglycerides of fatty acids. Examples of film-forming coating materials suitable for application by fluid bed techniques are given in GB 1483591. Liquid enzyme preparations may, for instance, be stabilized by adding a polyol such as propylene glycol, a sugar or sugar alcohol, lactic acid or boric acid according to established methods. Protected enzymes may be prepared according to the method disclosed in EP 238,216.

Adjunct Materials

Any detergent components known in the art for use in ADW detergents may also be utilized. Other optional detergent components include anti-corrosion agents, anti-shrink agents, anti-soil redeposition agents, anti-wrinkling agents, bactericides, binders, corrosion inhibitors, disintegrants/disintegration agents, dyes, enzyme stabilizers (including boric acid, borates, CMC, and/or polyols such as propylene glycol), fabric conditioners including clays, fillers/processing aids, fluorescent whitening agents/optical brighteners, foam boosters, foam (suds) regulators, perfumes, soil-suspending agents, softeners, suds suppressors, tarnish inhibitors, and wicking agents, either alone or in combination. Any ingredient known in the art for use ADW detergents may be utilized. The choice of such ingredients is well within the skill of the artisan.

Dispersants

The detergent compositions of the present invention can also contain dispersants. In particular powdered detergents may comprise dispersants. Suitable water-soluble organic materials include the homo- or co-polymeric acids or their salts, in which the polycarboxylic acid comprises at least two carboxyl radicals separated from each other by not more than two carbon atoms. Suitable dispersants are for example described in Powdered Detergents, Surfactant science series volume 71, Marcel Dekker, Inc.

Dye Transfer Inhibiting Agents

The detergent compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in a subject composition, the dye transfer inhibiting agents may be present at levels from about 0.0001% to about 10%, from about 0.01% to about 5% or even from about 0.1% to about 3% by weight of the composition.

Fluorescent Whitening Agent

The detergent compositions of the present invention will preferably also contain additional components that may tint articles being cleaned, such as fluorescent whitening agent or optical brighteners. Where present the brightener is preferably at a level of about 0.01% to about 0.5%. Any fluorescent whitening agent suitable for use in a laundry detergent composition may be used in the composition of the present invention. The most commonly used fluorescent whitening agents are those belonging to the classes of diaminostilbene-sulfonic acid derivatives, diarylpyrazoline derivatives and bisphenyl-distyryl derivatives. Examples of the diaminostilbene-sulfonic acid derivative type of fluorescent whitening agents include the sodium salts of: 4,4'-bis-(2-diethanolamino-4-anilino-s-triazin-6-ylamino) stilbene-2,2'-disulfonate, 4,4'-bis-(2,4-dianilino-s-triazin-6-ylamino) stilbene-2,2'-disulfonate, 4,4'-bis-(2-anilino-4-(N-methyl-N-2-hydroxy-ethylamino)-s-triazin-6-ylamino) stilbene-2,2'-disulfonate, 4,4'-bis-(4-phenyl-1,2,3-triazol-2-yl)stilbene-2,2'-disulfonate and sodium 5-(2H-naphtho[1,2-d][1,2,3]triazol-2-yl)-2-[(E)-2-phenylvinyl]benzenesulfonate.

Preferred fluorescent whitening agents are Tinopal DMS and Tinopal CBS available from Ciba-Geigy AG, Basel, Switzerland. Tinopal DMS is the disodium salt of 4,4'-bis-(2-morpholino-4-anilino-s-triazin-6-ylamino) stilbene-2,2'-disulfonate. Tinopal CBS is the disodium salt of 2,2'-bis-(phenyl-styryl)-disulfonate. Also preferred are fluorescent whitening agents is the commercially available Parawhite KX, supplied by Paramount Minerals and Chemicals, Mumbai, India. Other fluorescers suitable for use in the invention include the 1-3-diary) pyrazolines and the 7-alkylaminocoumarins.

Suitable fluorescent brightener levels include lower levels of from about 0.01, from 0.05, from about 0.1 or even from about 0.2 wt % to upper levels of 0.5 or even 0.75 wt %.

Soil Release Polymers

The detergent compositions of the present invention may also include one or more soil release polymers which aid the removal of soils from fabrics such as cotton and polyester based fabrics, in particular the removal of hydrophobic soils from polyester based fabrics. The soil release polymers may for example be nonionic or anionic terephthalte based polymers, polyvinyl caprolactam and related copolymers, vinyl graft copolymers, polyester polyamides see for example Chapter 7 in Powdered Detergents, Surfactant science series volume 71, Marcel Dekker, Inc. Another type of soil release polymers are amphiphilic alkoxylated grease cleaning polymers comprising a core structure and a plurality of alkoxylate groups attached to that core structure. The core structure may comprise a polyalkylenimine structure or a polyalkanolamine structure as described in detail in WO 2009/087523 (hereby incorporated by reference). Furthermore random graft co-polymers are suitable soil release polymers. Suitable graft co-polymers are described in more detail in WO 2007/138054, WO 2006/108856 and WO 2006/113314 (hereby incorporated by reference). Other soil release polymers are substituted polysaccharide structures especially substituted cellulosic structures such as modified cellulose deriviatives such as those described in EP 1867808 or WO 2003/040279 (both are hereby incorporated by reference). Suitable cellulosic polymers include cellulose, cellulose ethers, cellulose esters, cellulose amides and mixtures thereof. Suitable cellulosic polymers include anionically modified cellulose, nonionically modified cellulose, cationically modified cellulose, zwitterionically modified cellulose, and mixtures thereof. Suitable cellulosic polymers include methyl cellulose, carboxy methyl cellulose, ethyl cellulose, hydroxyl ethyl cellulose, hydroxyl propyl methyl cellulose, ester carboxy methyl cellulose, and mixtures thereof.

Anti-Redeposition Agents

The detergent compositions of the present invention may also include one or more anti-redeposition agents such as carboxymethylcellulose (CMC), polyvinyl alcohol (PVA), polyvinylpyrrolidone (PVP), polyoxyethylene and/or polyethyleneglycol (PEG), homopolymers of acrylic acid, copolymers of acrylic acid and maleic acid, and ethoxylated polyethyleneimines. The cellulose based polymers described under soil release polymers above may also function as anti-redeposition agents.

Rheology Modifiers

The detergent compositions of the present invention may also include one or more rheology modifiers, structurants or thickeners, as distinct from viscosity reducing agents. The rheology modifiers are selected from the group consisting of non-polymeric crystalline, hydroxy-functional materials, polymeric rheology modifiers which impart shear thinning characteristics to the aqueous liquid matrix of a liquid detergent composition. The rheology and viscosity of the detergent can be modified and adjusted by methods known in the art, for example as shown in EP 2169040.

Other suitable adjunct materials include, but are not limited to, anti-shrink agents, anti-wrinkling agents, bactericides, binders, carriers, dyes, enzyme stabilizers, fabric softeners, fillers, foam regulators, hydrotropes, perfumes, pigments, sod suppressors, solvents, and structurants for liquid detergents and/or structure elasticizing agents.

Formulation of Detergent Products

The detergent composition of the invention may be in any convenient form, e.g., a bar, a homogenous tablet, a tablet having two or more layers, a pouch having one or more compartments, a regular or compact powder, a granule, a paste, a gel, or a regular, compact or concentrated liquid.

Pouches can be configured as single or multicompartments. It can be of any form, shape and material which is suitable for hold the composition, e.g. without allowing the release of the composition to release of the composition from the pouch prior to water contact. The pouch is made from water soluble film which encloses an inner volume. Said inner volume can be divided into compartments of the pouch. Preferred films are polymeric materials preferably polymers which are formed into a film or sheet. Preferred polymers, copolymers or derivates thereof are selected polyacrylates, and water soluble acrylate copolymers, methyl cellulose, carboxy methyl cellulose, sodium dextrin, ethyl cellulose, hydroxyethyl cellulose, hydroxypropyl methyl cellulose, malto dextrin, poly methacrylates, most preferably polyvinyl alcohol copolymers and, hydroxypropyl methyl cellulose (HPMC). Preferably the level of polymer in the film for example PVA is at least about 60%. Preferred average molecular weight will typically be about 20,000 to about 150,000. Films can also be of blended compositions comprising hydrolytically degradable and water soluble polymer blends such as polylactide and polyvinyl alcohol (known under the Trade reference M8630 as sold by Mono-Sol LLC, Indiana, USA) plus plasticisers like glycerol, ethylene glycerol, propylene glycol, sorbitol and mixtures thereof. The pouches can comprise a solid laundry cleaning composition or part components and/or a liquid cleaning composition or part components separated by the water soluble film. The compartment for liquid components can be different in composition than compartments containing solids: US2009/0011970 A1. Detergent ingredients can be separated physically from each other by compartments in water dissolvable pouches or in different layers of tablets. Thereby negative storage interaction between components can be avoided. Different dissolution profiles of each of the compartments can also give rise to delayed dissolution of selected components in the wash solution.

A liquid or gel detergent, which is not unit dosed, may be aqueous, typically containing at least 20% by weight and up to 95% water, such as up to about 70% water, up to about 65% water, up to about 55% water, up to about 45% water, up to about 35% water. Other types of liquids, including without limitation, alkanols, amines, diols, ethers and polyols may be included in an aqueous liquid or gel. An aqueous liquid or gel detergent may contain from 0-30% organic solvent.

The invention includes the following particularly preferred embodiments:

Embodiment 1

A granule comprising
(a) a core which comprises an enzyme, surrounded by
(b) a first coating which comprises bleach catalyst particles, which is surrounded by
(c) a second coating comprising at least 60% by weight of a water-soluble salt having a constant humidity at 20° C. which is above 85%;
wherein the bleach catalyst particles comprise at least 80% by weight of a manganese complex with nitrogen-containing ligands; wherein at least 70% by weight of the particles have particle sizes in the range from 1 μm to 50 μm, at most 15% by weight of the particles have particle sizes of >50 μm and at most 15% by weight of the particles have particle sizes of <1 μm, wherein the percentages are based on the total amount of the particles.

Embodiment 2

The granule of embodiment 1, wherein the manganese complex comprises a ligand which is di- or trimethyl azacyclononane or a derivative thereof.

Embodiment 3

The granule of embodiment 1 or 2, wherein the manganese complex has the below formula (1) or (2):

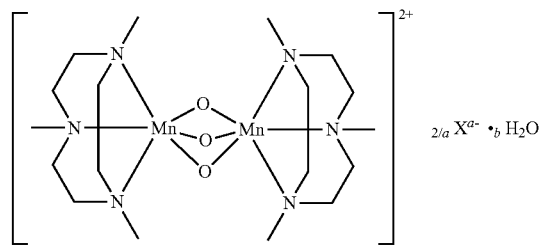

formula (1)

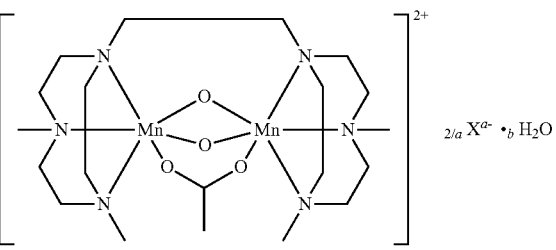

formula (2)

wherein a is 1 or 2, b is a number from 0 to 4, and X is any monovalent or divalent anion.

Embodiment 4

The granule of embodiment 3, wherein X is $PF_6^-$, $CH_3COO^-$, $Cl^-$, $SO_4^{2-}$, and in particular $PF_6^-$.

Embodiment 5

The granule of any one of embodiments 1 to 4, wherein the manganese complex is bis (N,N',N''-trimethyl-1,4,7-triazacyclononane)-trioxo-dimanganese (IV) di(hexafluorophosphate) monohydrate.

Embodiment 6

The granule of any one of embodiments 1 to 5, wherein the bleach catalyst particles comprises no particles having particle sizes greater than 100 μm and/or no particles having particle sizes of less than 100 nm.

Embodiment 7

The granule of any one of embodiments 1 to 6, wherein at least 90% by weight of the bleach catalyst particles have particle sizes in the range from 2 μm to 50 μm, at most 5% by weight of the particles have particle sizes of >50 μm, and at most 5% by weight of the particles have particle sizes of <2 μm, wherein the percentages are based on the total amount of the particles.

Embodiment 8

The granule of any one of embodiments 1 to 7, wherein the bleach catalyst particles have a volume average particle size $D_{50}$ in the range of 2 to 25 μm.

Embodiment 9

The granule of any one of embodiments 1 to 8, wherein the bleach catalyst particles have a volume average particle size $D_{97}$ in the range of 8 μm to 35 μm.

Embodiment 10

The granule of any one of embodiments 1 to 9, wherein the bleach catalyst particles have a volume average particle size $D_{97}$ in the range of 10 μm to 30 μm.

Embodiment 11

The granule of any one of embodiments 1 to 10, wherein the bleach catalyst particles have a volume average particle size $D_{97}$ in the range of 11 μm to 25 μm.

Embodiment 12

The granule of any one of embodiments 1 to 11, wherein the bleach catalyst particles have a volume average particle size $D_{97}$ in the range of 12 μm to 20 μm.

Embodiment 13

The granule of any one of embodiments 1 to 12, wherein the bleach catalyst particles are produced by the steps of:
(a) introducing a particulate material, comprising at least 80% by weight of manganese complexes with nitrogen-containing ligands, into a milling apparatus selected from the group consisting of a jet mill, a pin mill equipped with a cooling device, and a wet mill, wherein the milling apparatus is equipped with a particle separation device (such as a sieve or a cyclone),
(b) grinding the particulate material into a finely divided powder with the proviso that
(c) the temperature of the particulate material during the grinding does not exceed 95° C.

Embodiment 14

The granule of embodiment 13, wherein the grinding of step (b) is carried out so that at least 70% by weight of the total amount of particles of the finely divided powder have particle sizes in the range from 1 μm to 50 μm, at most 15% by weight of the particles have particle sizes of >50 μm, and at most 15% by weight of the particles have particle sizes of <1 μm.

Embodiment 15

The granule of embodiment 13 or 14, wherein the temperature of the ground material during the grinding is −15° C. to 95° C., preferably <70° C., more preferably <60° C., and most preferably <50° C.

Embodiment 16

The granule of any one of embodiments 13 to 15, wherein the temperature of the ground material during grinding is controlled by the supply of cooling gas or by the supply of liquefied gas.

Embodiment 17

The granule of any one of embodiments 13 to 16, wherein the coarse particles separated in the particle separation device are led back into the milling apparatus.

Embodiment 18

The granule of any one of embodiments 13 to 17, wherein the manganese complex containing particulate material is ground in dry state.

Embodiment 19

The granule of any one of embodiments 1 to 18, wherein the enzyme is an amylase, a lipase, a protease, a cellulase, a mannanase, or a pectate lyase.

Embodiment 20

The granule of any one of embodiments 1 to 19, wherein the core further comprises a reducing agent and/or an antioxidant and/or a salt of a multivalent cation and/or an acidic buffer.

Embodiment 21

The granule of embodiment 20, wherein the reducing agent is a thiosulfate, cysteine or methionine.

Embodiment 22

The granule of embodiment 20 or 21, wherein the reducing agent is present in an amount of 0.1-10% by weight relative to the core.

Embodiment 23

The granule of any one of embodiments 20 to 22, wherein the acidic buffer comprises a mixture of citric acid and a citrate.

Embodiment 24

The granule of any one of embodiments 20 to 23, wherein the acidic buffer is present in an amount of 0.1-10% by weight relative to the core.

Embodiment 25

The granule of any one of embodiments 20 to 24, wherein the salt of a multivalent cation is a salt of Mg or Zn.

Embodiment 26

The granule of any one of embodiments 20 to 25, wherein the salt of a multivalent cation is present in an amount of 0.1-15% as anhydrous salt by weight of the core, or 0.02-6% as multivalent cation by weight of the core.

Embodiment 27

The granule of any one of embodiments 1 to 26, wherein the second coating (c) makes up 5-70% by weight relative to the core and comprises at least 60% by weight w/w of a salt having a constant humidity at 20° C. of at least 60%.

Embodiment 28

The granule of any one of embodiments 1 to 27, wherein the second coating (c) comprises sodium sulfate.

Embodiment 29

The granule of any one of embodiments 1 to 28, which further comprises an additional coating on the outside of the second coating (c), wherein the additional coating comprises a film-forming agent, particularly polyethylene glycol, hydroxypropyl methyl cellulose (HPMC or MHPC), or polyvinyl alcohol (PVA).

Embodiment 30

A granular automatic dishwash detergent composition which comprises a bleaching system comprising a $H_2O_2$ source, which detergent composition further comprises a granule of any one of embodiments 1 to 29.

Embodiment 31

The composition of embodiment 30, which further comprises a bleach activator.

Embodiment 32

A method for stabilizing an enzyme in a bleach containing detergent composition, comprising incorporating the enzyme into a granule according to any one of embodiments 1 to 29.

Embodiment 33

A method for producing a granule comprising
(a) preparing a core which comprises an enzyme,
(b) surrounding the core with a first coating which comprises bleach catalyst particles,
(c) surrounding the first coating with a second coating comprising at least 60% by weight of a water-soluble salt having a constant humidity at 20° C. which is above 85%; wherein the bleach catalyst particles comprise at least 80% by weight of a manganese complex with nitrogen-containing ligands; wherein at least 70% by weight of the particles have particle sizes in the range from 1 μm to 50 μm, at most 15% by weight of the particles have particle sizes of >50 μm and at most 15% by weight of the particles have particle sizes of <1 μm, wherein the percentages are based on the total amount of the particles.

Embodiment 34

The method of embodiment 33, wherein the manganese complex comprises a ligand which is di- or trimethyl azacyclononane or a derivative thereof.

Embodiment 35

The method of embodiment 33 or 34, wherein the manganese complex has the below formula (1) or (2):

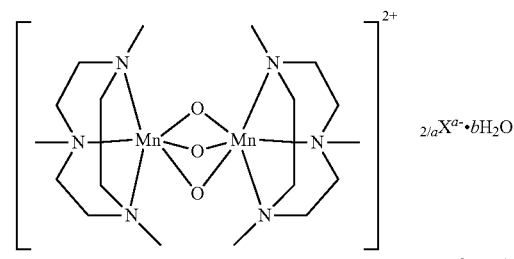

formula (1)

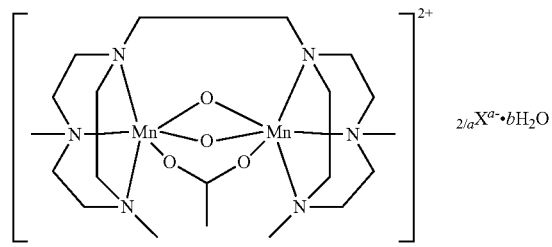

formula (2)

wherein a is 1 or 2, b is a number from 0 to 4, and X is any monovalent or divalent anion.

Embodiment 36

The method of embodiment 35, wherein X is $PF_6^-$, $CH_3COO^-$, $Cl^-$, $SO_4^{2-}$, and in particular $PF_6^-$.

Embodiment 37

The method of any one of embodiments 33 to 36, wherein the manganese complex is bis (N,N',N''-trimethyl-1,4,7-triazacyclononane)-trioxo-dimanganese (IV) di(hexafluorophosphate) monohydrate.

Embodiment 38

The method of any one of embodiments 33 to 37, wherein the bleach catalyst particles comprises no particles having particle sizes greater than 100 μm and/or no particles having particle sizes of less than 100 nm.

Embodiment 39

The method of any one of embodiments 33 to 38, wherein at least 90% by weight of the bleach catalyst particles have particle sizes in the range from 2 μm to 50 μm, at most 5% by weight of the particles have particle sizes of >50 μm, and at most 5% by weight of the particles have particle sizes of <2 μm, wherein the percentages are based on the total amount of the particles.

Embodiment 40

The method of any one of embodiments 33 to 39, wherein the bleach catalyst particles have a volume average particle size $D_{50}$ in the range of 2 to 25 μm.

Embodiment 41

The method of any one of embodiments 33 to 40, wherein the bleach catalyst particles have a volume average particle size $D_{97}$ in the range of 8 μm to 35 μm.

Embodiment 42

The method of any one of embodiments 33 to 9, wherein the bleach catalyst particles have a volume average particle size $D_{97}$ in the range of 10 μm to 30 μm.

Embodiment 43

The method of any one of embodiments 33 to 10, wherein the bleach catalyst particles have a volume average particle size $D_{97}$ in the range of 11 μm to 25 μm.

Embodiment 44

The method of any one of embodiments 33 to 11, wherein the bleach catalyst particles have a volume average particle size $D_{97}$ in the range of 12 μm to 20 μm.

Embodiment 45

The method of any one of embodiments 33 to 12, wherein the bleach catalyst particles are produced by the steps of:
(a) introducing a particulate material, comprising at least 80% by weight of manganese complexes with nitrogen-containing ligands, into a milling apparatus selected from the group consisting of a jet mill, a pin mill equipped with a cooling device, and a wet mill, wherein the milling apparatus is equipped with a particle separation device (such as a sieve or a cyclone),
(b) grinding the particulate material into a finely divided powder with the proviso that
(c) the temperature of the particulate material during the grinding does not exceed 95° C.

Embodiment 46

The method of embodiment 45, wherein the grinding of step (b) is carried out so that at least 70% by weight of the total amount of particles of the finely divided powder have particle sizes in the range from 1 μm to 50 μm, at most 15% by weight of the particles have particle sizes of >50 μm, and at most 15% by weight of the particles have particle sizes of <1 μm.

Embodiment 47

The method of embodiment 45 or 46, wherein the temperature of the ground material during the grinding is −15° C. to 95° C., preferably <70° C., more preferably <60° C., and most preferably <50° C.

Embodiment 48

The method of any one of embodiments 45 to 47, wherein the temperature of the ground material during grinding is controlled by the supply of cooling gas or by the supply of liquefied gas.

Embodiment 49

The method of any one of embodiments 45 to 48, wherein the coarse particles separated in the particle separation device are led back into the milling apparatus.

Embodiment 50

The method of any one of embodiments 45 to 49, wherein the manganese complex containing particulate material is ground in dry state.

Embodiment 51

The method of any one of embodiments 33 to 50, wherein the enzyme is an amylase, a lipase, a protease, a cellulase, a mannanase, or a pectate lyase.

Embodiment 52

The method of any one of embodiments 33 to 51, wherein the core further comprises a reducing agent and/or an antioxidant and/or a salt of a multivalent cation and/or an acidic buffer.

Embodiment 53

The method of embodiment 52, wherein the reducing agent is a thiosulfate, cysteine or methionine.

Embodiment 54

The method of embodiment 52 or 53, wherein the reducing agent is present in an amount of 0.1-10% by weight relative to the core.

Embodiment 55

The method of any one of embodiments 52 to 54, wherein the acidic buffer comprises a mixture of citric acid and a citrate.

Embodiment 56

The method of any one of embodiments 52 to 55, wherein the acidic buffer is present in an amount of 0.1-10% by weight relative to the core.

Embodiment 57

The method of any one of embodiments 52 to 56, wherein the salt of a multivalent cation is a salt of Mg or Zn.

Embodiment 58

The method of any one of embodiments 52 to 57, wherein the salt of a multivalent cation is present in an amount of 0.1-15% as anhydrous salt by weight of the core, or 0.02-6% as multivalent cation by weight of the core.

Embodiment 59

The method of any one of embodiments 33 to 58, wherein the second coating makes up 5-70% by weight relative to the core and comprises at least 60% by weight w/w of a salt having a constant humidity at 20° C. of at least 60%.

Embodiment 60

The method of any one of embodiments 33 to 59, wherein the second coating comprises sodium sulfate.

Embodiment 61

The method of any one of embodiments 33 to 60, wherein an additional coating is applied on the outside of the second coating, wherein the additional coating comprises a film-forming agent, particularly polyethylene glycol, hydroxypropyl methyl cellulose (HPMC or MHPC), or polyvinyl alcohol (PVA).

EXAMPLES

Chemicals used as buffers and substrates were commercial products of at least reagent grade. The protease used in Example 1 has the amino acid sequence shown in SEQ ID NO: 1.

Example 1

Wash Performance of Stabilized Enzyme Granules

A protease was co-granulated with 4% wt. MnTACN particles. The MnTACN used in the granulation was a finely divided powder with an average particle size $D_{50}$ of approximately 15 μm. The granules contained a salt coating comprising sodium sulphate, and a final polymer coating.

The granules were stored for 0, 2 and 4 weeks in an automatic dishwash detergent, and tested using a full scale wash in a Miele G4300 SCU automatic dishwashing machine. Washing program used was Universal 50° C., using tap water with water hardness 20° dH with a total washing time of about 90 minutes. The washing programme comprises a rinsing cycle, a washing cycle followed by two rinsing cycles.

The automatic dishwash detergent that was used is shown in Table 1. In addition 50 grams of soil was added into the machine before start. The soil was prepared as described in SÖFW-Journal, volume 132, No 8-2006. Melamine plates DM-93 Minced meat from CFT, The Netherlands, were added into the Miele G4300 SCU machine in order to evaluate the protease wash performance.

TABLE 1

| Detergent composition. | |
|---|---|
| Sodium sulfate | 38% |
| Surfac 23-6.5 (liq) | 5% |
| Sodium citrate | 20% |
| Sodium carbonate | 17% |
| Sodium disilicate | 5% |
| Acusol 588 (granulated) | 5% |
| Sodium percarbonate | 10% |
| Total amount | 100% |

The wash assay was used to evaluate the storage stability of the co-granulated protease with MnTACN. A granulated protease without MnTACN was used as reference. The two granulates contained the same amount of the protease.

The sample with the highest residual protease activity after storage exhibits the highest wash performance. Wash performance is thus a measure of the residual activity, and the residual activity is a measure of the storage stability. High reflectance measurements correspond to a high wash performance.

The storage stability was evaluated by mixing the granulated protease/MnTACN with the detergent composition, putting the samples in open glasses, and storing in a climatic chamber at 37° C. and 70% RH for time 0, 2 and 4 weeks. Each sample contained 0.54 g granulate. The samples were then used in the wash assay as described above, reflectance of the melamin plates were measured, and the results are shown in Table 2 below.

TABLE 2

| Total reflectance at 460 nm measured on CFT DM-93 Minced meat melamine plates. | | | |
|---|---|---|---|
| Granulate | 0 weeks | 2 weeks | 4 weeks |
| Protease without MnTACN | 81.3 | 59.7 | 46.0 |
| Protease with MnTACN | 81.5 | 81.4 | 79.9 |

As shown in Table 2, the storage stability of the protease co-granulated with MnTACN is very high, as compared to the granulated protease without MnTACN.

The invention claimed is:

1. A granule comprising (a) a core which comprises an enzyme, surrounded by (b) a first coating which comprises bleach catalyst particles, which is surrounded by (c) a second coating comprising at least 60% by weight of a water-soluble salt having a constant humidity at 20° C. which is above 85%;

wherein the bleach catalyst particles comprise at least 80% by weight of a manganese complex with nitrogen-containing ligands, characterized in that at least 70% by weight of the particles have particle sizes in the range from 1 μm to 50 μm, at most 15% by weight of the particles have particle sizes of >50 μm, and at most 15% by weight of the particles have particle sizes of <1 μm, wherein the percentages are based on the total amount of the particles.

2. The granule of claim 1, wherein the nitrogen-containing ligands comprise at least one ligand selected from di- or trimethyltriazacyclononanes.

3. The granule of claim 1, wherein the manganese complex has the below formula (1) or (2):

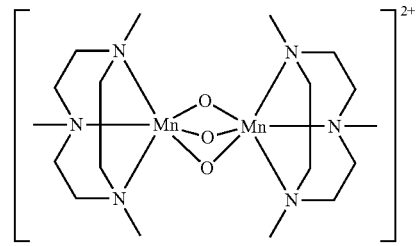

formula (1)

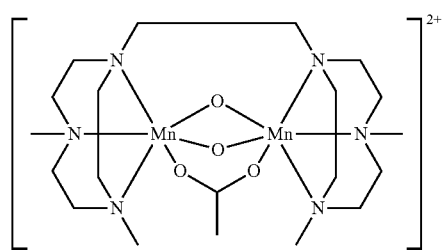

formula (2)

wherein a is 1 or 2, b is a number from 0 to 4, and X is any monovalent or divalent anion.

4. The granule of claim 1, wherein the manganese complex is bis (N,N',N"-trimethyl-1,4,7-triazacyclononane)-trioxo-dimanganese (IV) di(hexafluorophosphate) monohydrate.

5. The granule of claim 1, wherein the bleach catalyst particles have a volume average particle size D50 in the range of 2 to 25 µm.

6. The granule of claim 1, wherein the enzyme is an amylase, a lipase, a protease, a cellulase, a mannanase, or a pectate lyase.

7. The granule of claim 1, wherein the core further comprises a reducing agent and/or an antioxidant and/or a salt of a multivalent cation and/or an acidic buffer.

8. The granule of claim 7, wherein the reducing agent is a thiosulfate, cysteine, or methionine.

9. The granule of claim 7, wherein the reducing agent is present in an amount of 0.1-10% by weight relative to the core.

10. The granule of claim 7, wherein the acidic buffer comprises a mixture of citric acid and a citrate.

11. The granule of claim 7, wherein the acidic buffer is present in an amount of 0.1-10% by weight relative to the core.

12. The granule of claim 7, wherein the salt of a multivalent cation is a salt of Mg or Zn.

13. The granule of claim 7, wherein the salt of a multivalent cation is present in an amount of 0.1-15% as anhydrous salt by weight of the core, or 0.02-6% as multivalent cation by weight of the core.

14. The granule of claim 1, wherein the coating makes up 5-70% by weight relative to the core and comprises at least 60% by weight w/w of a salt having a constant humidity at 20° C. of at least 60%.

15. The granule of claim 1, wherein the second coating comprises sodium sulfate.

16. The granule of claim 1, which further comprises an additional coating on the outside of the second coating, wherein the additional coating comprises a film-forming agent selected from the group consisting of polyethylene glycol, hydroxypropyl methyl cellulose, and polyvinyl alcohol (PVA).

17. A method for producing a granule comprising
(a) preparing a core which comprises an enzyme,
(b) surrounding the core with a first coating which comprises bleach catalyst particles,
(c) surrounding the first coating with a second coating comprising at least 60% by weight of a water-soluble salt having a constant humidity at 20° C. which is above 85%;
wherein the bleach catalyst particles comprise at least 80% by weight of a manganese complex with nitrogen-containing ligands; wherein at least 70% by weight of the particles have particle sizes in the range from 1 µm to 50 µm, at most 15% by weight of the particles have particle sizes of >50 µm and at most 15% by weight of the particles have particle sizes of <1 µm, wherein the percentages are based on the total amount of the particles.

18. A granular automatic dishwash detergent composition which comprises a bleaching system comprising a $H_2O_2$ source, which detergent composition further comprises a granule of claim 1.

19. The composition of claim 18, which further comprises a bleach activator.

* * * * *

SEQUENCE LISTING

<160> NUMBER OF SEQ ID NOS: 1

<210> SEQ ID NO 1
<211> LENGTH: 269
<212> TYPE: PRT
<213> ORGANISM: bacillus clausii

<400> SEQUENCE: 1

Ala Gln Ser Val Pro Trp Gly Ile Arg Arg Val Gln Ala Pro Thr Ala
1               5                   10                  15

-continued

```
His Asn Arg Gly Leu Thr Gly Ser Gly Val Lys Val Ala Val Leu Asp
            20                  25              30
Thr Gly Ile Ser Thr His Pro Asp Leu Asn Ile Arg Gly Gly Ala Ser
        35              40              45
Phe Val Pro Gly Glu Pro Ser Thr Gln Asp Gly Asn Gly His Gly Thr
50                      55                  60
His Ala Ala Gly Thr Ile Ala Ala Leu Asn Asn Ser Ile Gly Val Leu
65              70                  75              80
Gly Val Ala Pro Ser Ala Glu Leu Tyr Ala Val Lys Val Leu Gly Ala
                85              90              95
Ser Gly Ser Gly Ser Val Ser Ser Ile Ala Gln Gly Leu Glu Trp Ala
            100             105             110
Gly Asn Asn Gly Met His Val Ala Asn Leu Ser Leu Gly Ser Pro Ser
        115             120             125
Pro Ser Ala Thr Leu Glu Gln Ala Val Asn Ser Ala Thr Ser Arg Gly
130             135                 140
Val Leu Val Val Ala Ala Ser Gly Asn Ser Gly Ala Gly Ser Ile Ser
145             150             155             160
Tyr Pro Ala Arg Tyr Ala Asn Ala Met Ala Val Gly Ala Thr Asp Gln
            165             170             175
Asn Asn Asn Arg Ala Ser Phe Ser Gln Tyr Gly Ala Gly Leu Asp Ile
            180             185             190
Val Ala Pro Gly Val Asn Val Gln Ser Thr Tyr Pro Gly Ser Thr Tyr
            195             200             205
Ala Ser Leu Asp Gly Thr Ser Met Ala Thr Pro His Val Ala Gly Ala
        210             215             220
Ala Ala Leu Val Lys Gln Lys Asn Pro Ser Trp Ser Asn Val Arg Ile
225             230             235             240
Arg Asn His Leu Lys Asn Thr Ala Thr Ser Leu Gly Ser Thr Asn Leu
            245             250             255
Tyr Gly Ser Gly Leu Val Asn Ala Glu Ala Ala Thr Arg
            260             265
```